March 6, 1945.   J. W. BRYCE   2,370,616
COMBINED DIVIDING AND MULTIPLYING MACHINE
Filed July 12, 1944   19 Sheets-Sheet 1

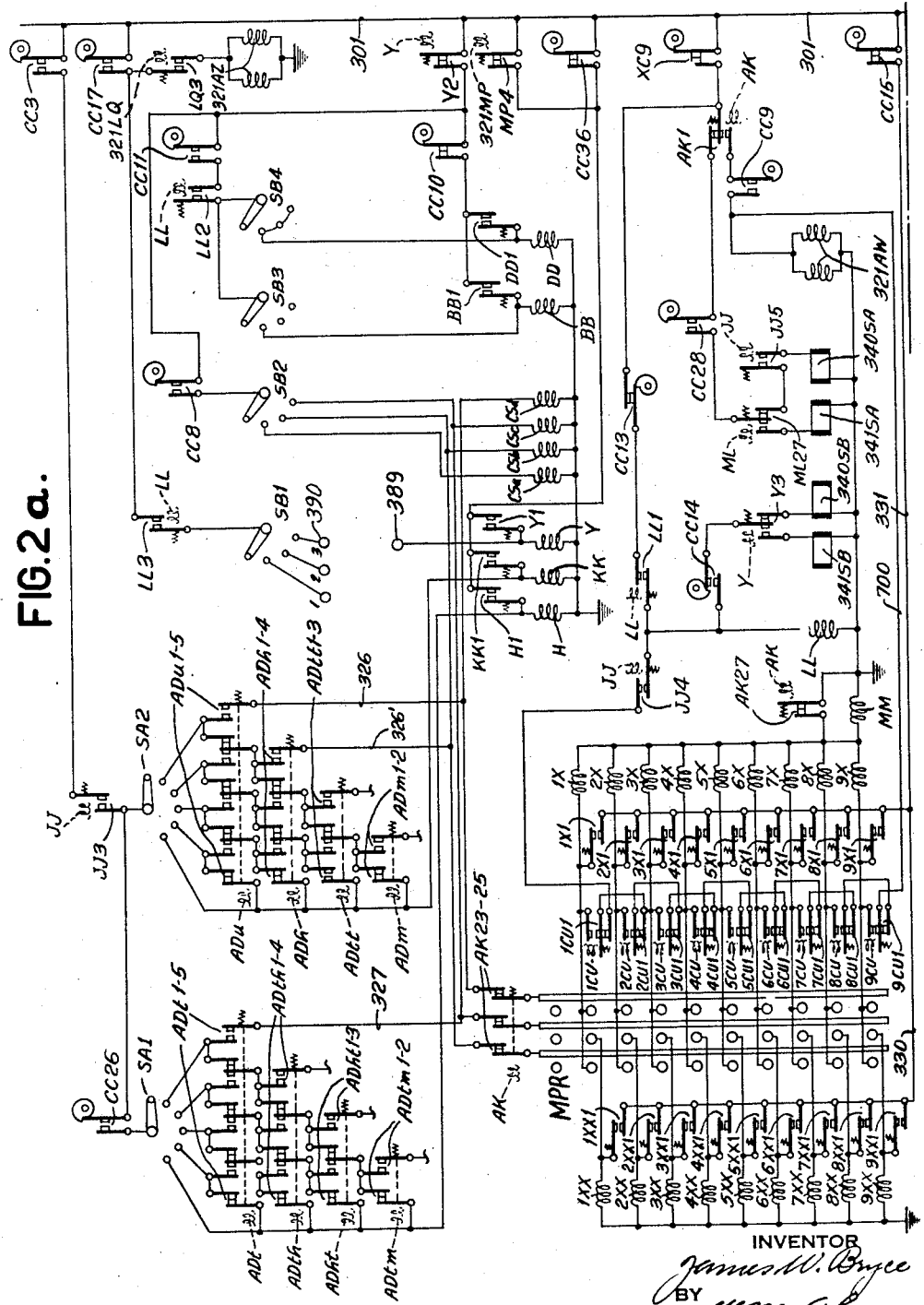

March 6, 1945.    J. W. BRYCE    2,370,616
COMBINED DIVIDING AND MULTIPLYING MACHINE
Filed July 12, 1944    19 Sheets-Sheet 4

FIG.2b.

INVENTOR
James W. Bryce
BY
W. M. Wilson
ATTORNEY

March 6, 1945. J. W. BRYCE 2,370,616
COMBINED DIVIDING AND MULTIPLYING MACHINE
Filed July 12, 1944   19 Sheets-Sheet 5
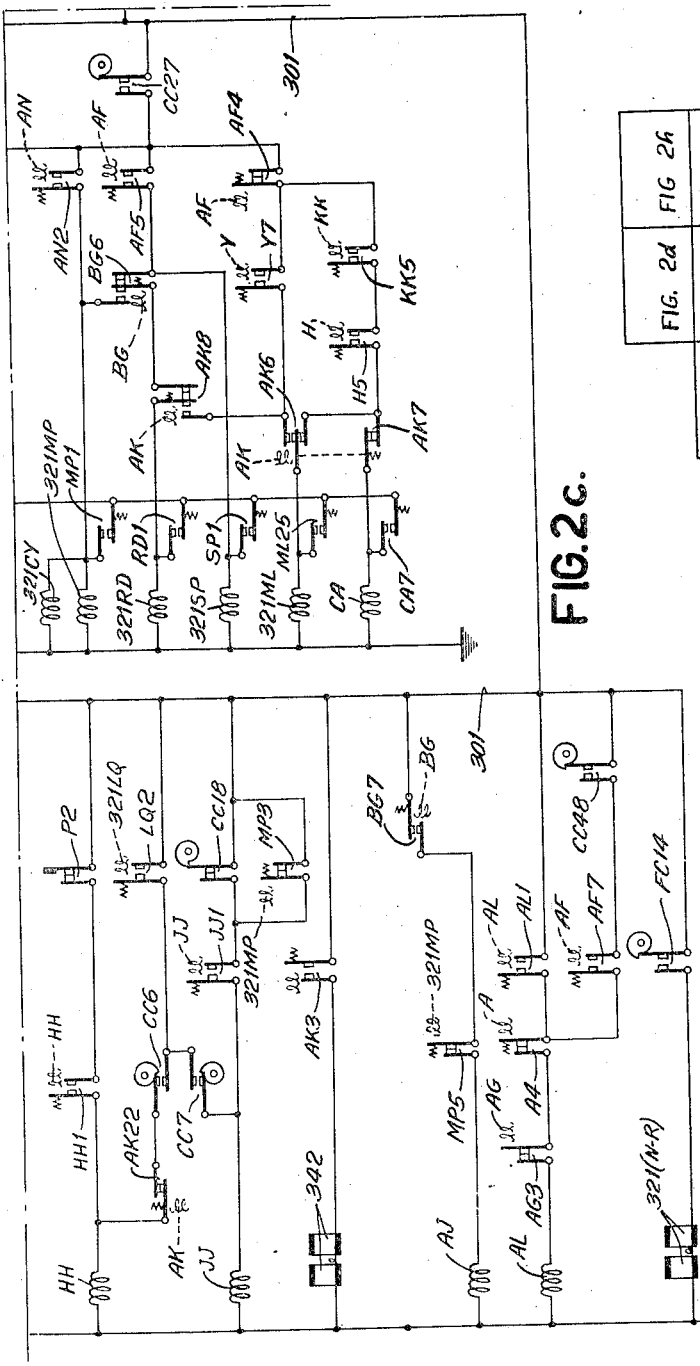

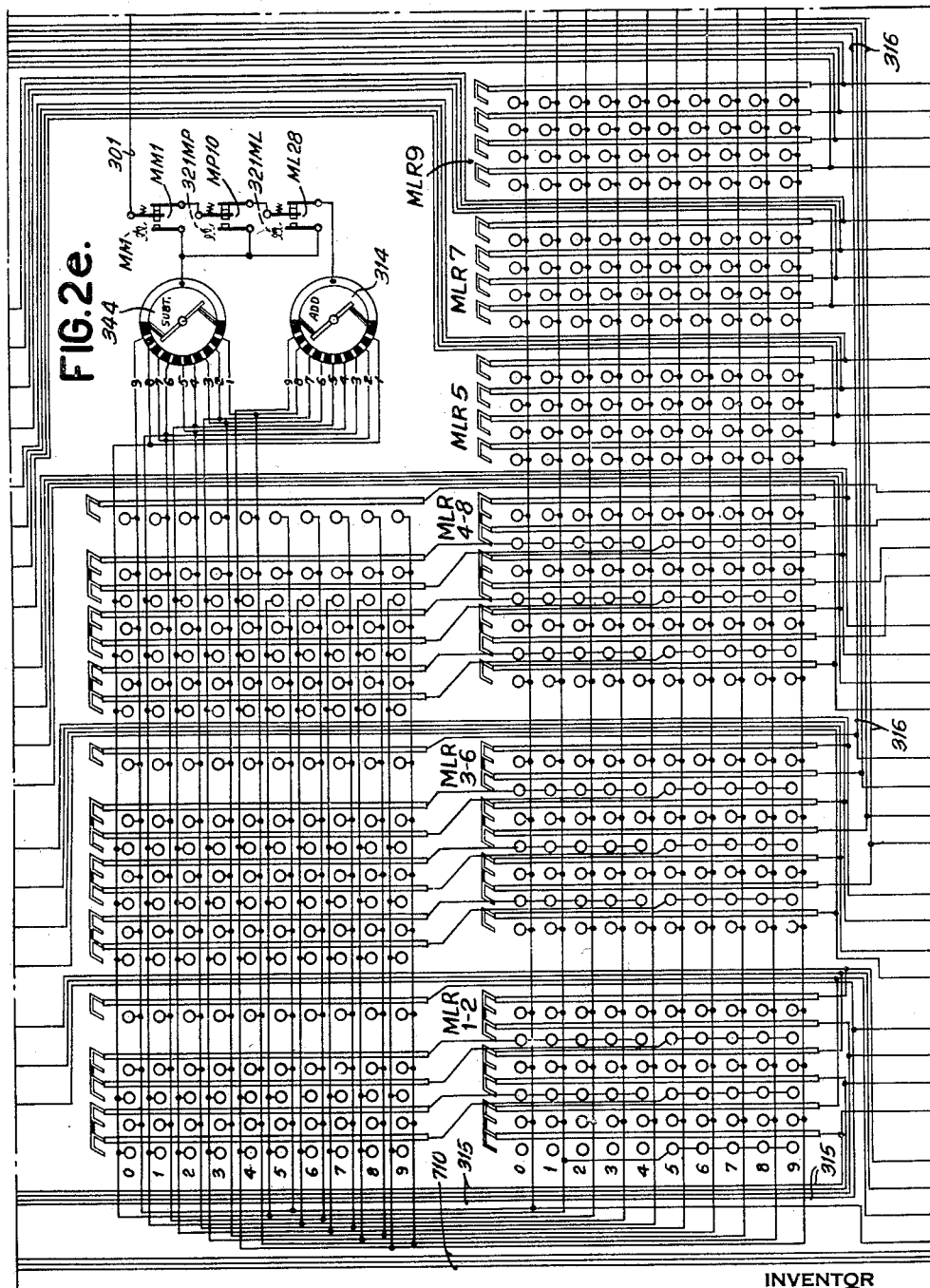

March 6, 1945.    J. W. BRYCE    2,370,616
COMBINED DIVIDING AND MULTIPLYING MACHINE
Filed July 12, 1944    19 Sheets-Sheet 8

INVENTOR
James W. Bryce
BY
W. M. Wilson
ATTORNEY

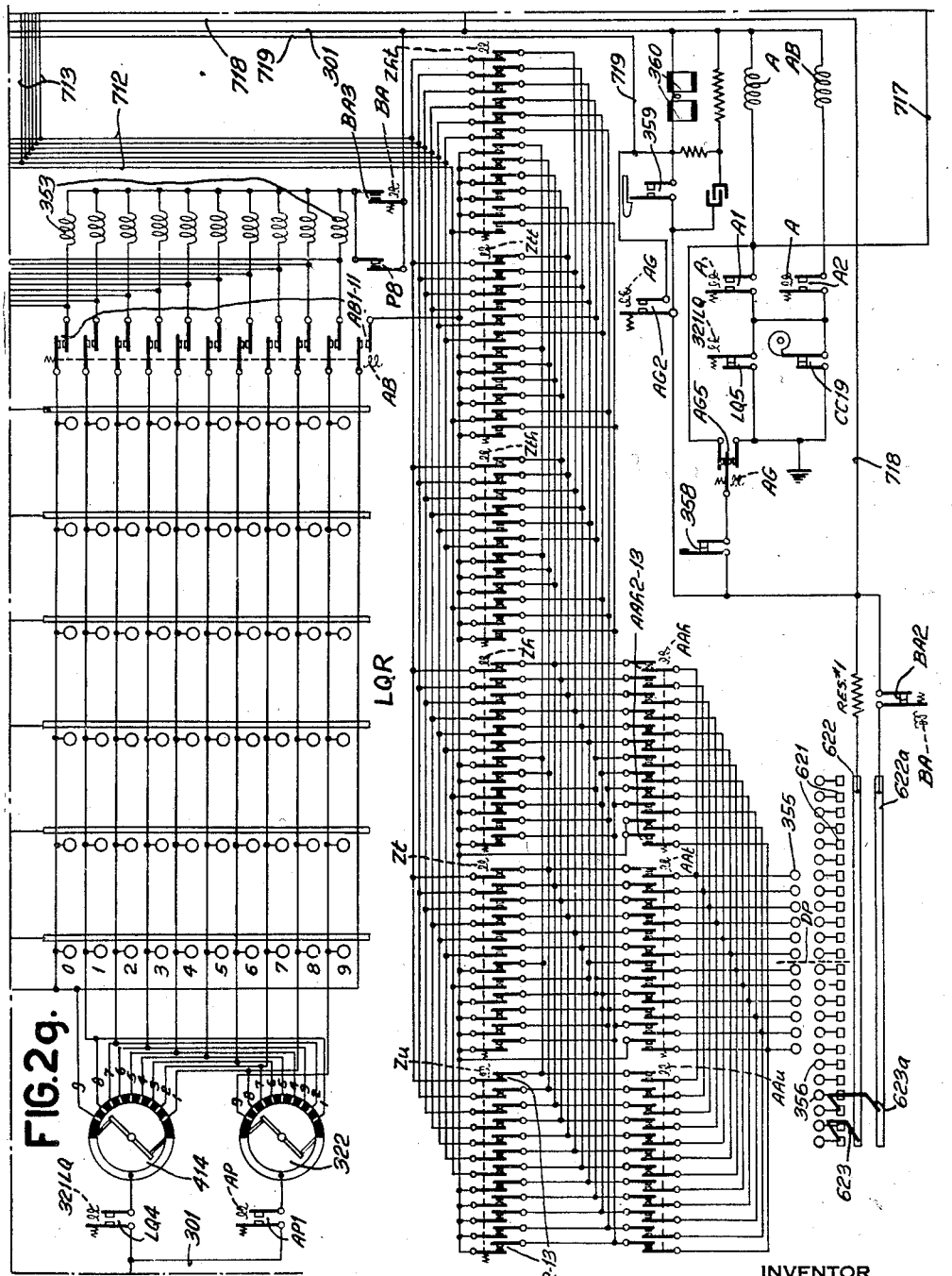

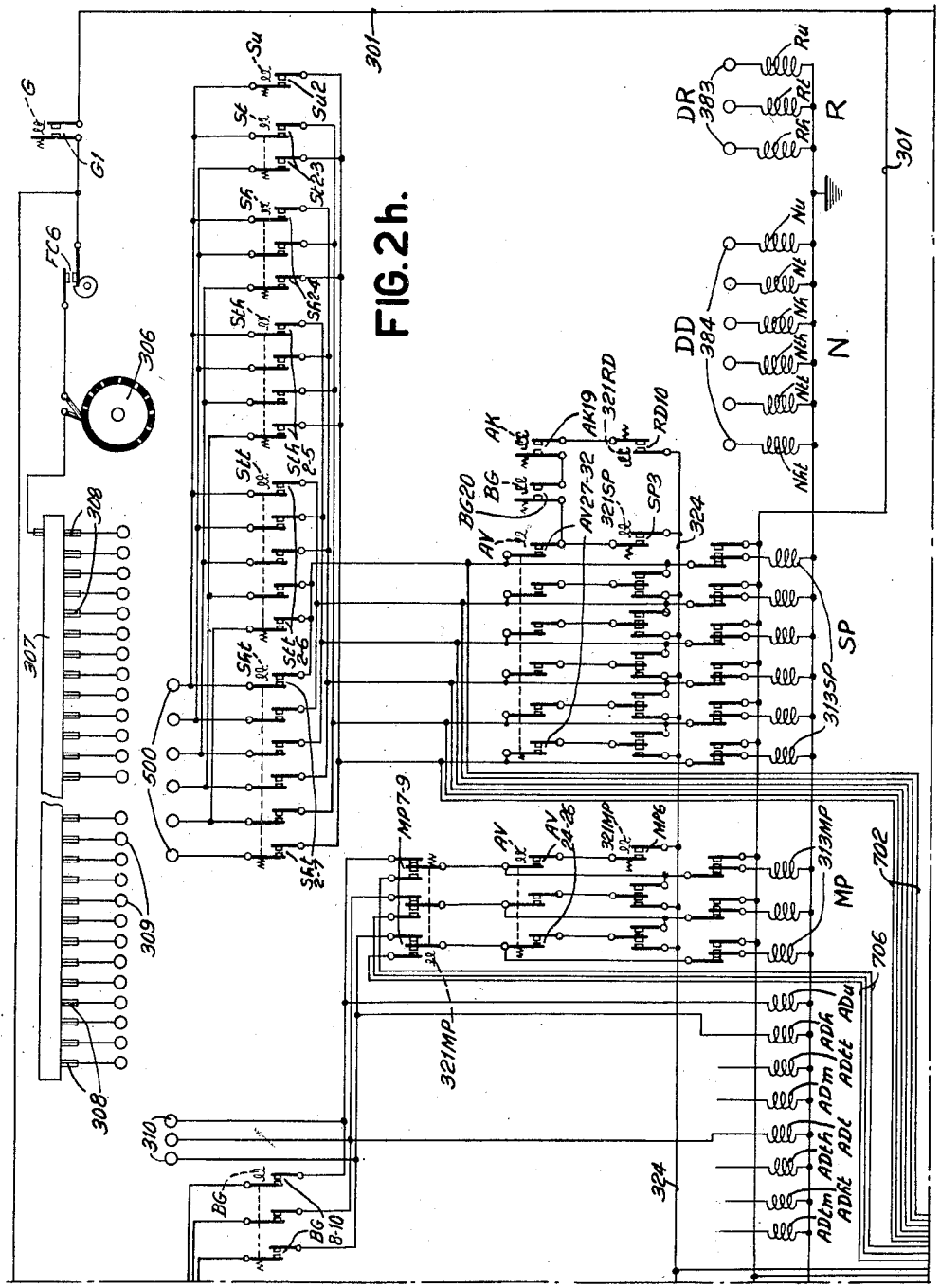

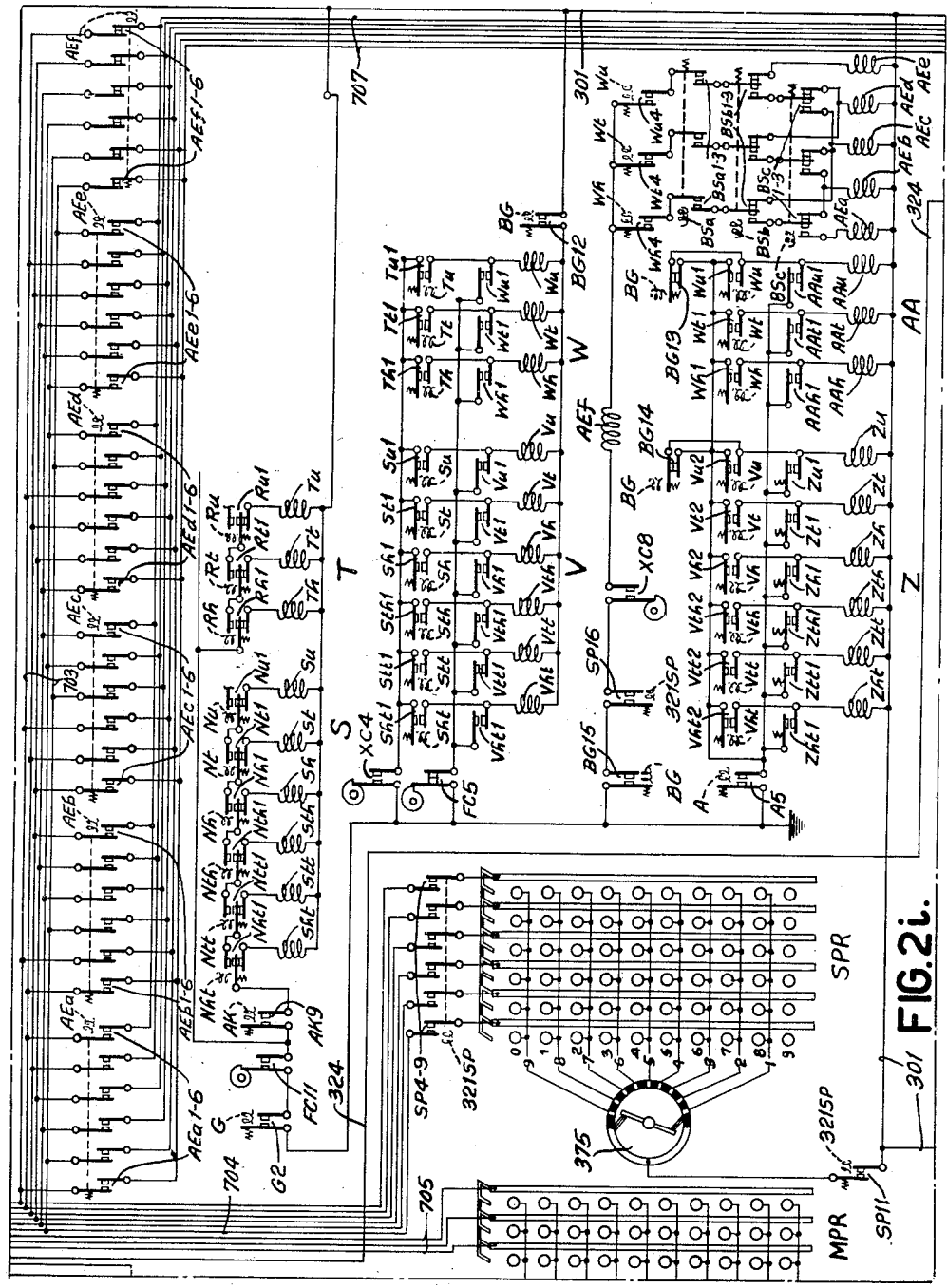

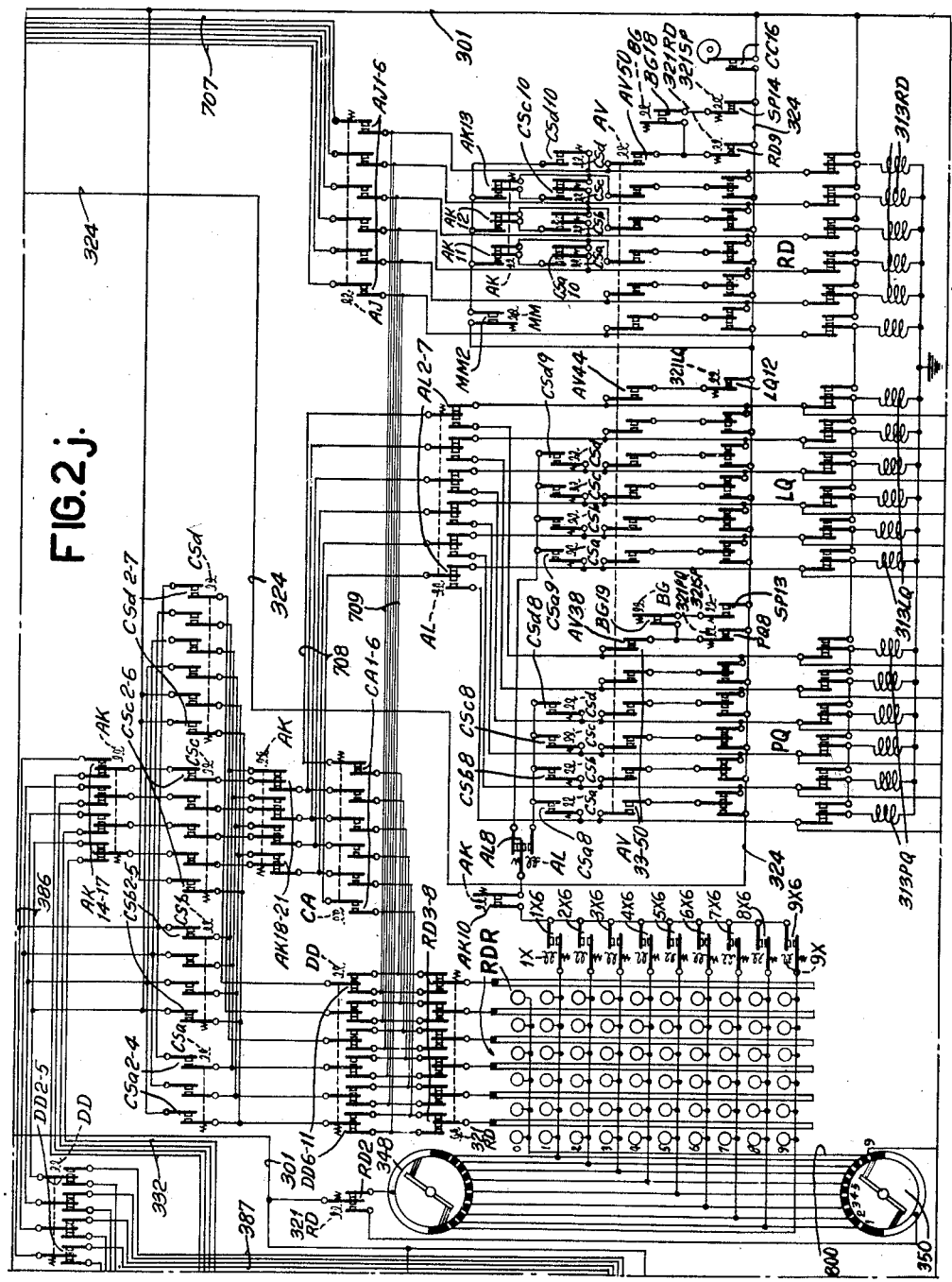

March 6, 1945.  J. W. BRYCE  2,370,616
COMBINED DIVIDING AND MULTIPLYING MACHINE
Filed July 12, 1944  19 Sheets-Sheet 14
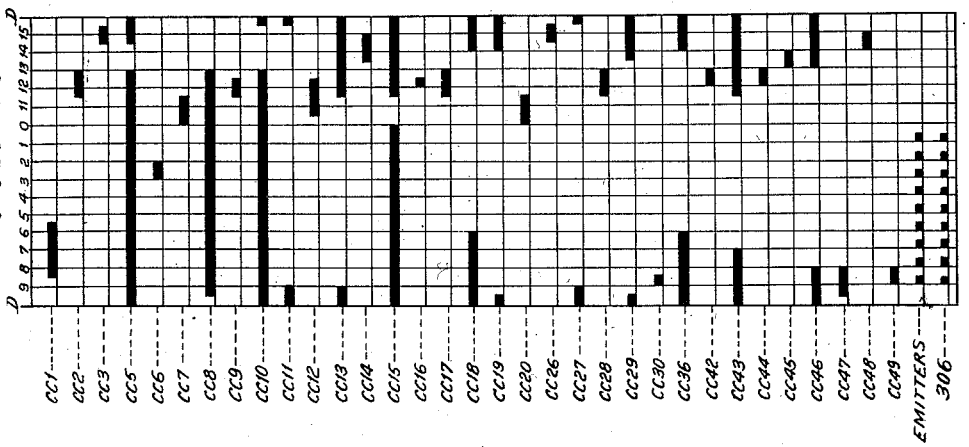
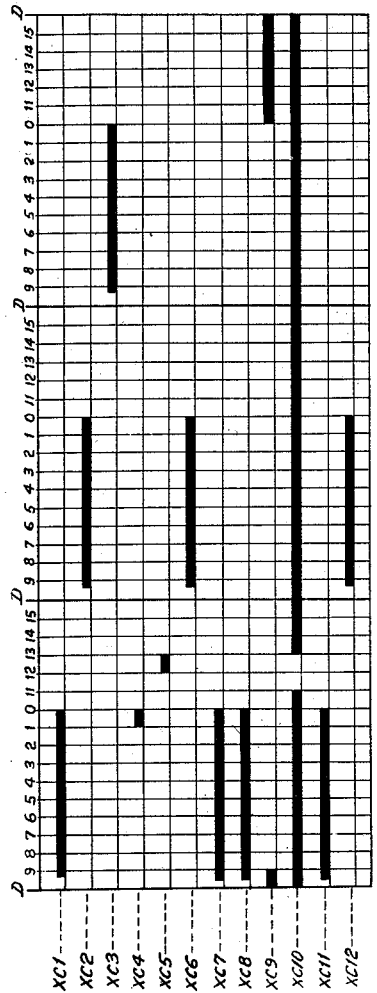
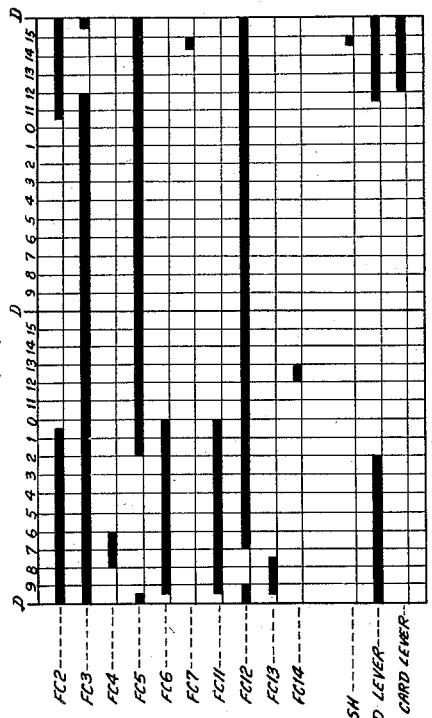
INVENTOR
James W. Bryce
BY
ATTORNEY March 6, 1945. J. W. BRYCE 2,370,616
COMBINED DIVIDING AND MULTIPLYING MACHINE
Filed July 12, 1944 19 Sheets-Sheet 15

INVENTOR
James W. Bryce
BY
W. M. Wilson
ATTORNEY

March 6, 1945.   J. W. BRYCE   2,370,616
COMBINED DIVIDING AND MULTIPLYING MACHINE
Filed July 12, 1944   19 Sheets-Sheet 16

March 6, 1945.  J. W. BRYCE  2,370,616
COMBINED DIVIDING AND MULTIPLYING MACHINE
Filed July 12, 1944   19 Sheets-Sheet 17

INVENTOR
James W. Bryce
BY
ATTORNEY

March 6, 1945.  J. W. BRYCE  2,370,616
COMBINED DIVIDING AND MULTIPLYING MACHINE
Filed July 12, 1944  19 Sheets-Sheet 18
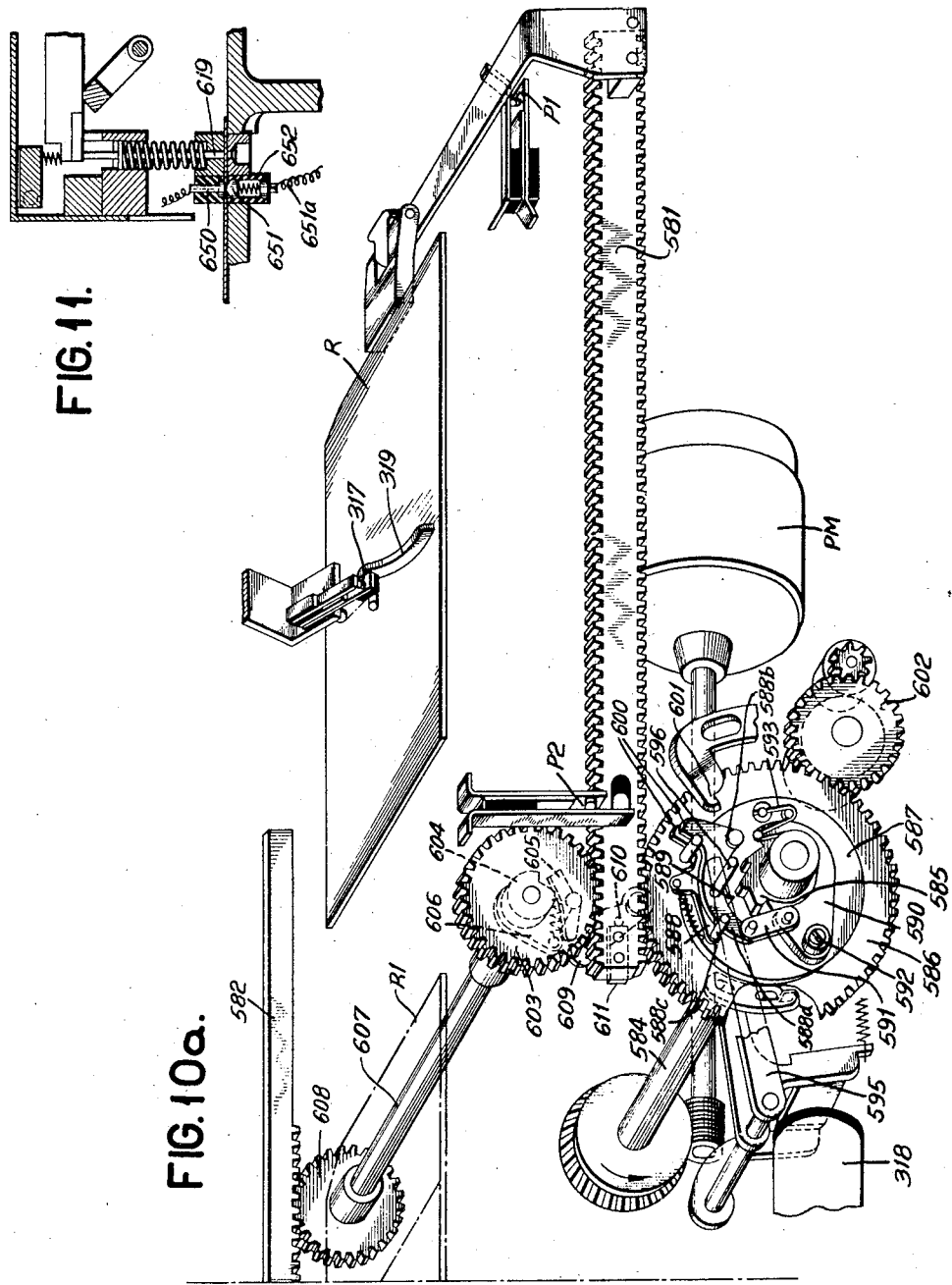
INVENTOR
james W. Bryce
BY
ATTORNEY March 6, 1945.  J. W. BRYCE  2,370,616
COMBINED DIVIDING AND MULTIPLYING MACHINE
Filed July 12, 1944   19 Sheets-Sheet 19
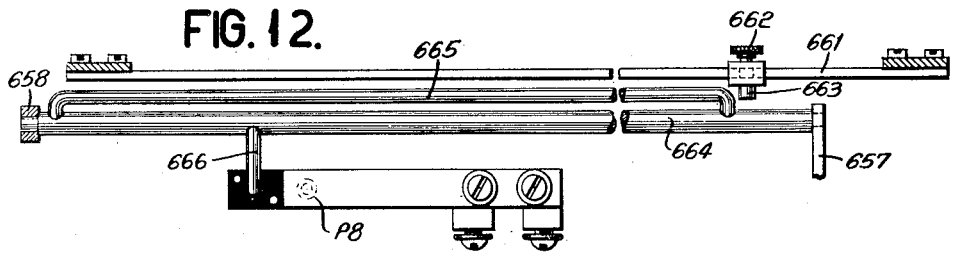
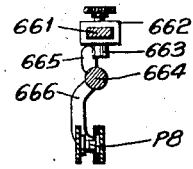 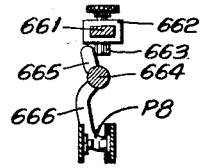
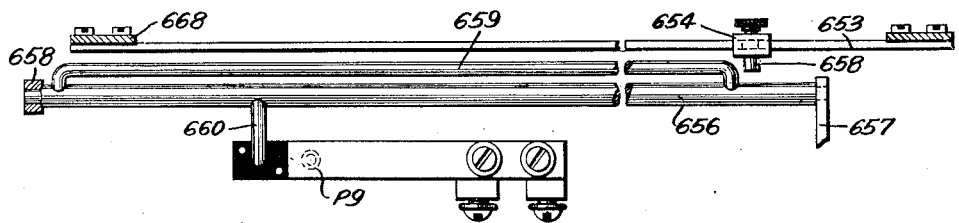
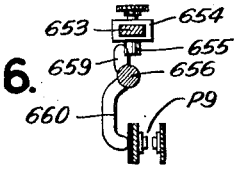 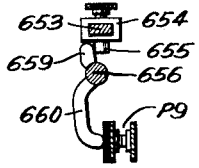
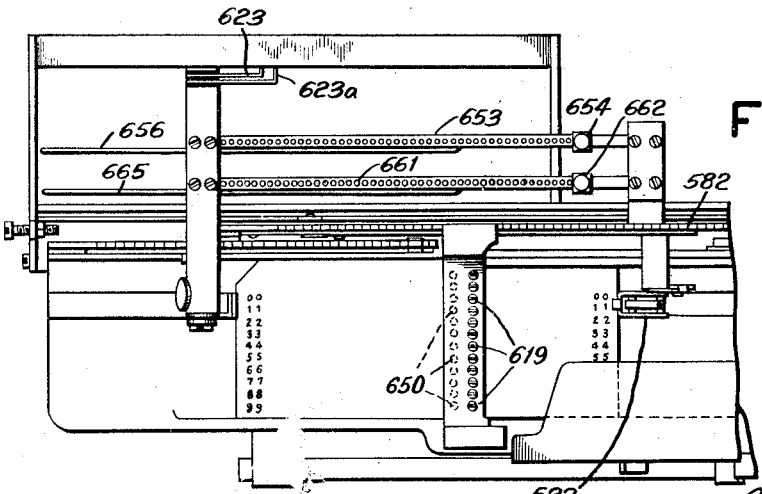
INVENTOR
James W. Bryce
BY
ATTORNEY Patented Mar. 6, 1945

2,370,616

UNITED STATES PATENT OFFICE 2,370,616

COMBINED DIVIDING AND MULTIPLYING MACHINE

James W. Bryce, Glen Ridge, N. J., assignor to International Business Machines Corporation, New York, N. Y., a corporation of New York Application July 12, 1944, Serial No. 544,486

8 Claims. (Cl. 235—61.8)

This invention relates generally to calculating machines which are provided with both multiplying and dividing mechanisms and particularly to the type of machine wherein the result of the computation secured by the operation of the dividing mechanism is checked by a multiplying computation performed by the multiplying mechanism. The checking of such computations is particularly useful and advantageous in record controlled machines wherein the computation result is recorded upon the record containing the original factors and since the accuracy of the computation result is vital in the accounting system in which the results of the computations are utilized, the checking operations are necessary and particularly desirable in accounting systems where extreme accuracy in results is required.

This application is a continuation in part of application Serial No. 519,721, filed January 26, 1944, which latter is a division of application Serial No. 430,324, filed February 11, 1942. Claims herein are directed to the feature of checking the quotient results of a dividing computation by a multiplying computation without re-running the card controlling the division computation through the machine.

According to arrangements previously devised, it was proposed in Patent No. 2,343,399, dated March 7, 1944 to provide a machine which would enable a computation to be performed by a dividing mechanism to secure a quotient result, and record the result on the card. It was proposed to have the factors of the computation, namely the dividend and divisor for the computation of division, together with the recorded quotient result taken from the card, then effect the subsequent multiplying computation by re-running the card through the machine. The change for the recomputation could not be effected automatically and required reconditioning of the machine for the recomputation by manual intervention which consisted primarily of replugging. By the provision of suitable checking devices, the correctness of the recorded quotient upon the record at the termination of the original combination was ascertained. If the quotient result recorded was found incorrect, the operator of the machine was accordingly signaled so that the incorrectly recorded card could be removed and the computation again performed to secure the correct computation result. For each inaccuracy found in the computation result, a card was lost and while the value of the card per se was of no material consequence, yet it required the reperforating of a card for the factors of the computation.

It is also contemplated in Patent No. 2,206,218 to R. Blakely, dated July 2, 1940 to provide a machine which will check the product result of a multiplying computation by a subsequent recomputation of the same type without, however, requiring that the product result be recorded and the cards be re-run through the machine. Checking devices were also provided to check the newly acquired product before it is recorded upon the card, against the subsequently derived product result. Upon agreement, product recording would then ensue and by this arrangement, the reperforating of a card upon locating an incorrectly derived product was avoided. However, the recomputation for checking purposes was performed by the same type of computation, that is, an original multiplying operation was automatically followed by a subsequent multiplying operation. While, as stated in this patent, checking multiplying is effected with the factor entry relations reversed so as to provide different operations of the computing mechanisms involved, nevertheless there are mechanisms which are commonly operated for the original and subsequent computation in the same way, and furthermore, the checking of the originally derived product against the newly computed product does not provide for the extreme accuracy required in checking.

Accordingly, the present invention provides to overcome the disadvantages of the previous arrangements by automatically effecting a re-computation by a multiplying computation and since some of the same calculating mechanisms do not operate in the original and recomputation, the desired efficiency in checking is attained. Furthermore, in the actual checking operation, different value representations are compared rather than the comparison of supposedly the same values, such as the product, as was proposed in the aforementioned Patent No. 2,206,218.

The principal object of the present invention is, therefore, to provide an arrangement which will effect a dividing computation and then automatically perform without manual intervention a multiplying computation under control of one of the factors for the original computation and the previously derived quotient result.

More specifically, it is an object of the invention to provide an arrangement of the type just described with checking devices which will determine whether the quotient result of the original computation is correct.

A still further object is to suppress the recording of the quotient result upon the record until the termination of the operation of the multiplying mechanism and the operation of the checking devices which has determined whether or not the quotient result is correct.

More specifically it is a further object of the invention to provide for a computation of division, utilizing the dividing mechanism which operates under control of the divisor and dividend factors derived from a card, then automatically effect a multiplying operation utilizing the previously derived quotient as one of the factors and the divisor factor as the multiplier for controlling the multiplying computation. Further, the remainder in the computation of division is taken into consideration and its deduction from the amount of the dividend should, if the computation is correctly performed, equal the newly derived product.

A still further object of the invention in connection with the specific form of multiplying and dividing mechanisms is to utilize a type which enables either computation to be performed with a minimum number of computing cycles. For the want of a better name, this is termed a computing mechanism of the "digital multiple comparison type"; that is to say, multiples of one factor are set up for comparison purposes upon effecting division, or for addition of selected multiples for multiplying operations. In connection with this specific form of the machine is an object of the invention to provide a common multiple receiving means which will enable multiples to be set up of one of the factors when effecting one type of computation, and then automatically cleared out of such representation so digital multiples of another factor to be ultilized in the recomputation may be represented thereon.

A still further object of the present invention is to provide certain entry shift mechanisms in addition to those normally provided under control of the digit representations on the cards which are effected in a well known manner. Where one type of computation automatically follows another type of computation, certain additional entry shifts must be provided so as to enable the representation of the factor amounts in the proper denominational order and these additional supplemental entry shifts form a relatively important part of the present invention.

In checking the quotient result of a dividing computation by an automatic multiplying operation, certain additional entry shifts are made over those previously utilized. The quotient digit results are entered in an accumulator beginning at the extreme left then to the right by successive orders and since this is one factor which is utilized in the multiplying computation, the setup of the quotient digit result for digital multiples requires that an entry shift be made so that the entry will be made in the digital multiple receiving units in the proper denominational order. Here again there is an entry shift to shift the entry from the extreme left of one accumulator to the extreme right to another accumulator.

An additional entry shift is also required in the transfer of the amount of the dividend less the remainder to the accumulator which receives the product result effected by the recomputation. As is well known, the dividend entry is made at the extreme left and since this amount less the remainder should be compared with the product result, the subtraction of the balance amount from the newly derived product should be made in the proper denominational orders.

As will be made very clear as the specification progresses, this entry shift is dependent upon two factors; that is, the number of quotient digits to which the dividing computation is to be carried out, and also the number of significant digits in the dividend receiving accumulator.

It is pointed out that by the provision of such supplemental entry shifts, a recomputation may automatically follow the original computation without manual intervention, the different denominational shifts being automatically effected so as to cause entries in the proper denominational orders.

Other objects of the invention will be pointed out in the following description and claims and illustrated in the accompanying drawings, which disclose, by way of example, the principle of the invention and the best mode, which has been contemplated, of applying that principle.

In the drawings:

Fig. 1 and 1a taken together with Fig. 1a to the right of Fig. 1 show a somewhat diagrammatic view of the various units of the machine and the drive therefor.

Figs. 2a to 2k, inclusive, taken together show the complete circuit diagram of the machine when arranged as shown in Fig. 3.

Fig. 3 shows the manner in which Figs. 2a–2k should be coordinated.

Fig. 4 is a cam timing diagram showing the timing of the various CC cams.

Fig. 5 is a cam timing diagram of the FC cams.

Fig. 6 is a cam timing diagram of the XC cams.

Figure 10:
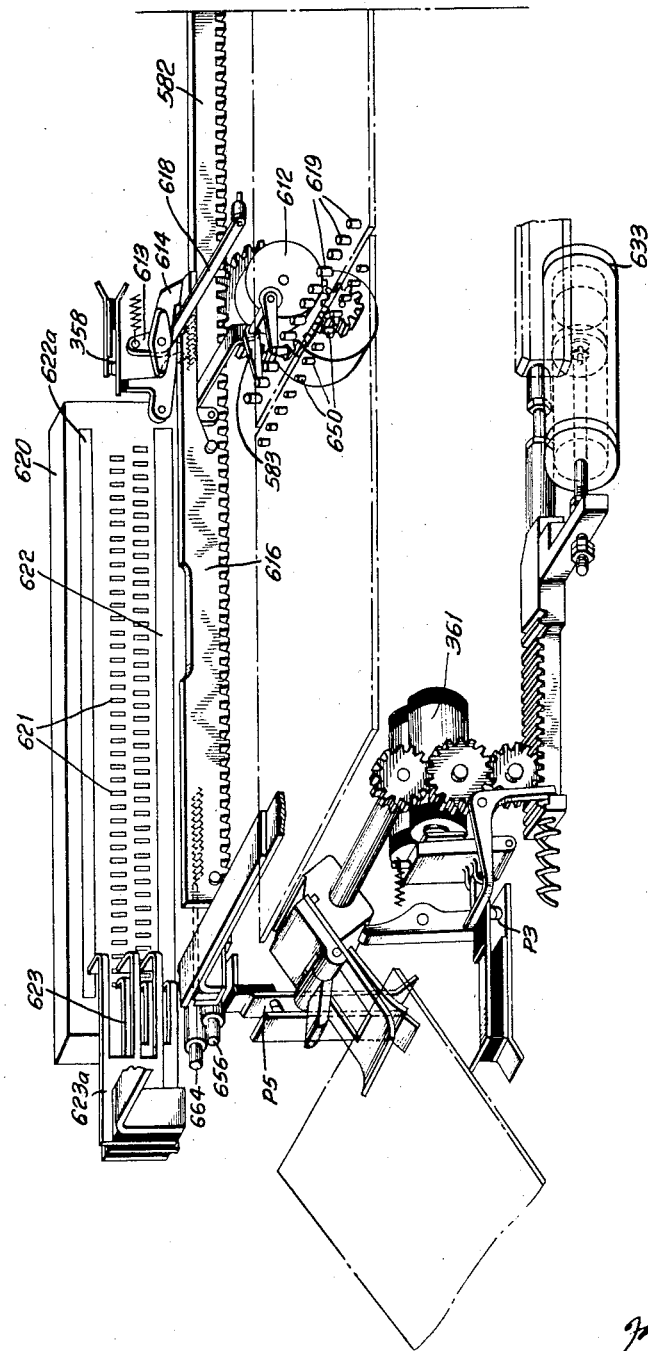

Figs. 10 and 10a with Fig. 10 at the left show a perspective view of the illustrative punching machine, only the elements essential to the understanding of this machine being illustrated.

Fig. 11 is a sectional view taken through the special analyzing mechanism in the punching machine for analyzing the punched holes representing the computation result for comparison with the computation result representing means it is controlled by.

Figs. 12–17 are views of the contact controlling devices provided in the punching machine, Figs. 12 and 15 being views in front elevation. Figs. 13 and 16 are sectional views and Figs. 14 and 17 are views corresponding to Figs. 13 and 16 but with the parts shown in operated position.

Fig. 18 is a plan view of part of the punching machine indicating the location of the contact controlling devices shown in Figs. 12–17.

Machine drive

Figure 1:
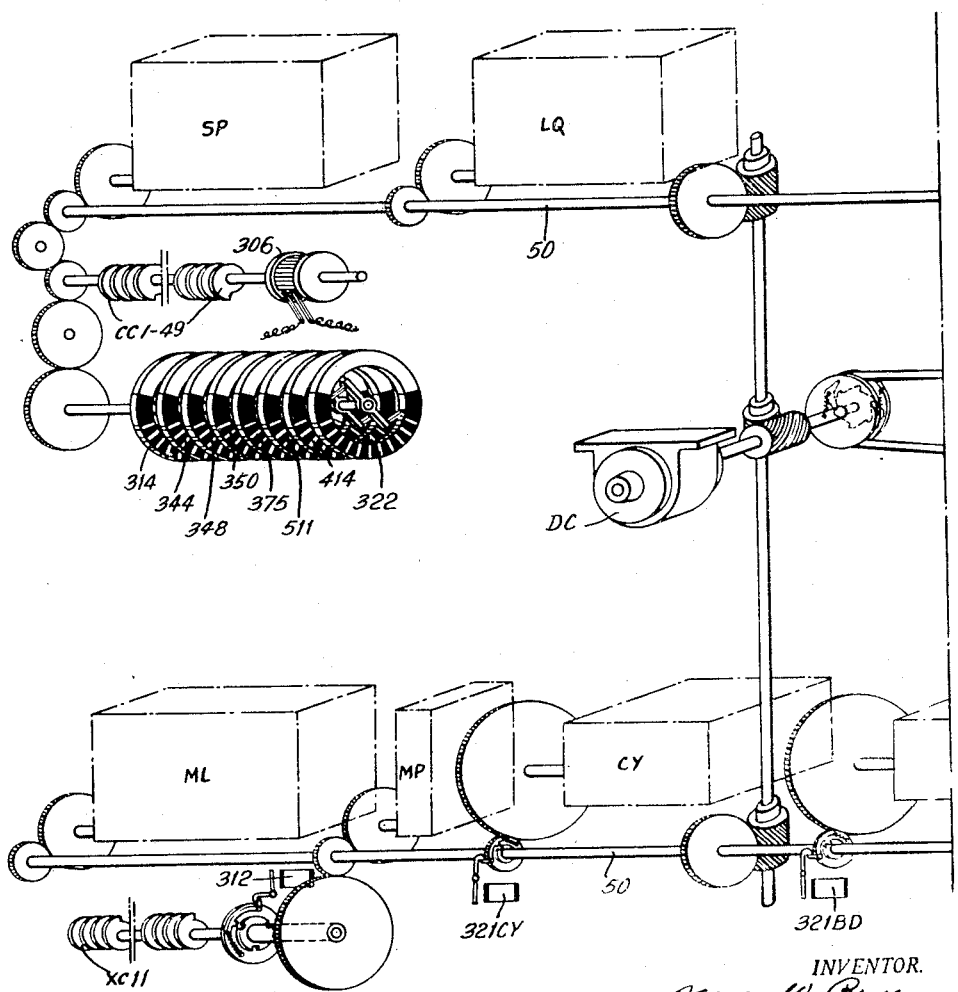
Figure 1:
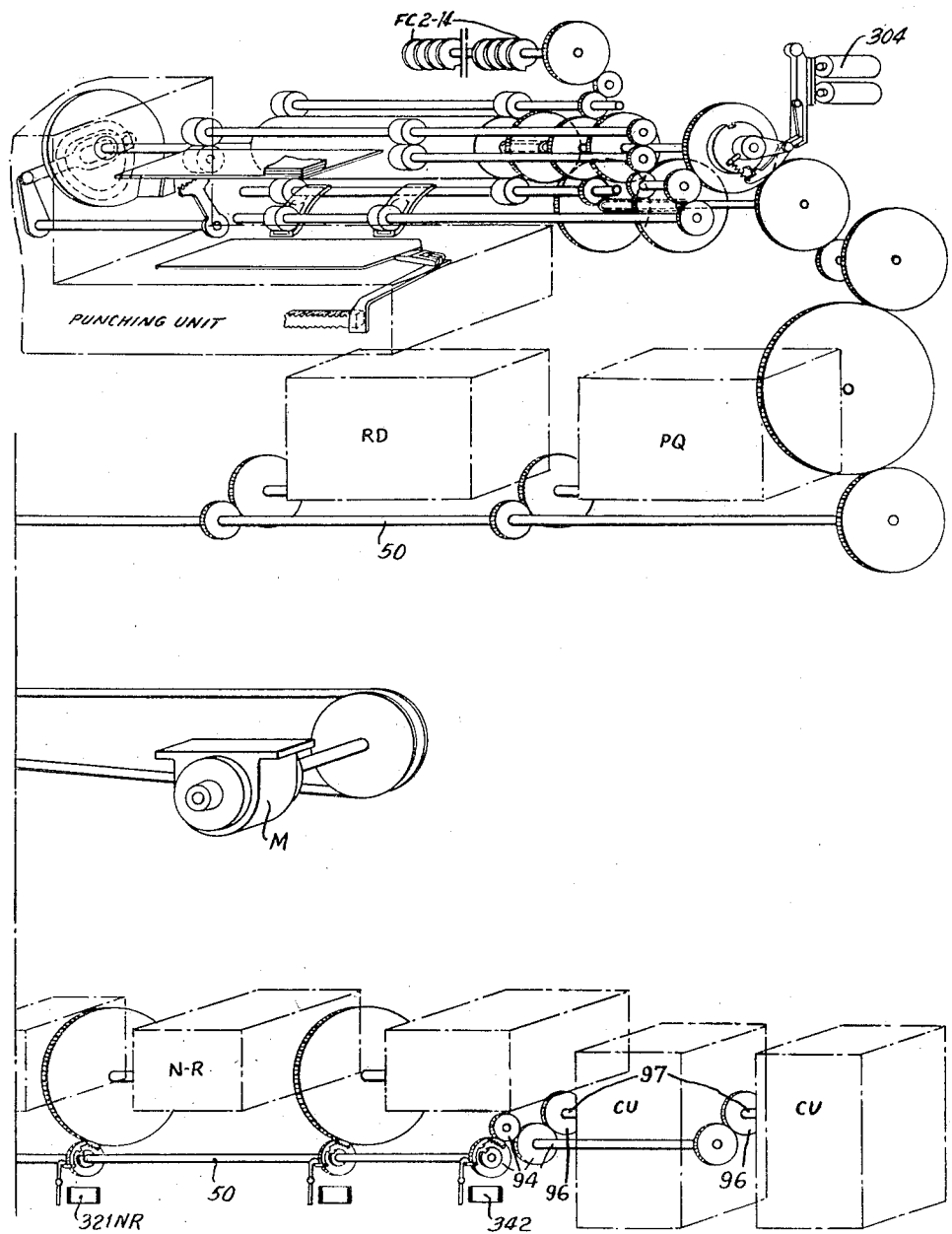

Referring first to Figs. 1 and 1a, in general the machine is similar in type to the computing mechanisms shown in Patents No. 2,328,610 and No.

2,315,686 and herein comprises six accumulating units which are respectively designated SP, LQ, RD, PQ, ML, and MP. It may be explained that the ML unit contains accumulators and readouts from which all of the nine digital multiples of the divisor or multiplicand can be derived, depending upon whether the machine is used for division or multiplication. The MP receiving device receives the multiplier upon entry for multiplying calculations. The accumulating units PQ and RD receive components of the products upon multiplication with the final product formed in PQ and upon division LQ receives the quotient amount and RD receives the dividend amount. The SP unit is utilized to store values which are to be used for checking.

The various accumulating units are driven by the gearing delineated from the driving motor M. The machine is also provided with a direct current generator DC. The card handling and feeding section of the machine is of customary form like that shown in the Daly Patent No. 2,045,437 and in Fig. 11 of Patent No. 2,315,686. The punching section of this machine, however, has been modified and will be explained in detail later. The FC cam contacts are also driven in the customary manner in synchronism with the drive of the card handling section of the machine. The units designated CY, O, N—R, are electromechanical relay setup units of the general construction shown in Figs. 16 and 17 of Patent No. 2,315,686. Each of these units is adapted for reset from the constantly running drive shaft by the customary one-revolution clutch arrangement. The reset magnets for the units are respectively designated 321CY, X, and 321N—R. The comparing units are as shown diagrammatically at CU—CU. These comparing units are of the forms shown in Figs. 12 to 15, inclusive, of Patent No. 2,315,686 and such units are adapted to be driven from the drive shaft by the use of the well known one-revolution clutch, the clutch magnet being designated 342. Also driven from the main drive shaft are the usual CC cams designated CC1—49, and the impulse distributor 306. In addition, there are also provided eight impulse emitters which are designated 314, 344, 348, 350, 375, 511, 414, and 322. Referring now to the XC1—11 cam contacts, such cam contacts are driven from the drive shaft through a one-revolution clutch which is controlled by magnet 312. The drive side of the one-revolution clutch receives its drive from the main drive shaft through the gearing shown which drives the XC cams one revolution for each three revolutions of the main drive shaft.

For clarity and subsequent description, the upper and lower drive shafts will be given a like reference numeral 50.

*Accumulators and entry receiving devices*

As stated, the SP, LQ, RD, PQ, ML and MP units are accumulators of the electromechanical type. These accumulators are identical in construction except for the number of readout sections, some accumulators having four readout sections and others having two. The accumulator which is here employed may be of various types known in the art, more particularly the type of accumulator having electrical transfer and electrical reset. Suitable accumulators of this type are shown and described in United States Patent No. 1,834,767 and suitable readout structure may be that shown in United States Patent No. 2,062,117 employing the electric reset of Patent No. 1,834,767, modified as per British Patent No. 422,135.

The present invention involves transfer total arrangements according to British Patent No. 422,135.

While the aforesaid accumulators are of suitable type for use with the present invention, preferably a preferred accumulator is of the form illustrated and described in Lake and Pfaff Patent No. 2,232,006, dated February 18, 1941. This accumulator is more fully shown in Patent No. 2,315,686.

*Insertible plugboards*

In order to quickly shift the machine controls from one status in which it is capable of effecting one type of computation to another status for effecting another type of computation use is made of insertible plugboard elements. This insertible plugboard construction is of a type known in the art and the insertible plug unit is generally indicated at 141 in Fig. 18 of Patent No. 2,315,686. Devices of this type are generally known as "automatic plugboards" and a suitable form of such board is shown and fully described in the patent issued to C. D. Lake, No. 2,111,118, dated March 15, 1938. Such automatic plugboard arrangement comprises a series of relatively fixed machine sockets to which the fixed machine wiring is connected. Adapted for cooperation with such sockets are plug prongs carried by a replaceable plugboard assembly or unit. Such plug prongs on the replaceable board are in turn connected to plug sockets upon the replaceable board. These plugboard sockets may be in turn plugged up by the operator selectively at will or the entire board may be pre-plugged with a desired set of connections.

Figure 7:
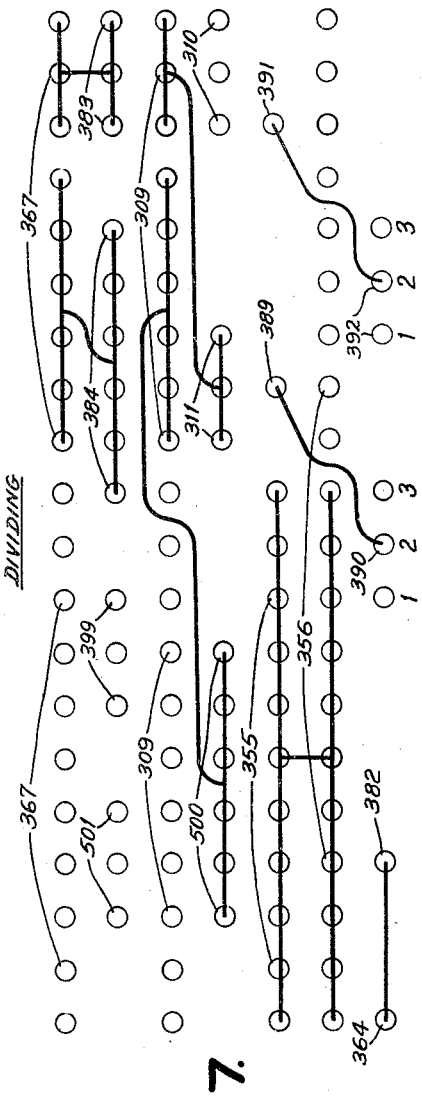
Fig. 7 shows the plugging on the insertible plugboard for the calculation which the machine is adapted to perform.

The manner in which the replaceable plugboard unit 141 is wired and plugged for the computation is shown in Fig. 7.

It may be explained that the plug socket reference numerals used on the circuit diagram will have similar reference numerals to those used on the diagrammatic plugboard.

*Cam timing diagrams*

The cam timing diagram, Figs. 4 to 6, inclusive are self-explanatory. It should be noted that the CC cam contacts of Fig. 4 make one revolution per machine cycle. The FC cam contacts of Fig. 5 make one revolution per card feed cycle which comprises two machine cycles. The XC contacts of Fig. 6 make one revolution for three machine cycles.

*Checking by multiplying the quotient result of dividing computations before recording the result*

For the purpose of checking the quotient results and the remainder derived as a result of dividing operations effected by the machine disclosed herein, the machine is provided with means for checking such results, that is, preferably using the divisor as a multiplier, the quotient as a multiplicand and then effecting a multiplying operation. The newly derived product is entered into an accumulator and in this accumulator the dividend amount less the remainder is subtractively entered to thereby bring this accumulator to zero. Therefore, in addition to the regular multiplying operations the machine goes through checking operations by multiplying to determine whether the previous dividing operation has been correctly performed, and if correct, recording of the quotient result will ensue.

Figure 9:
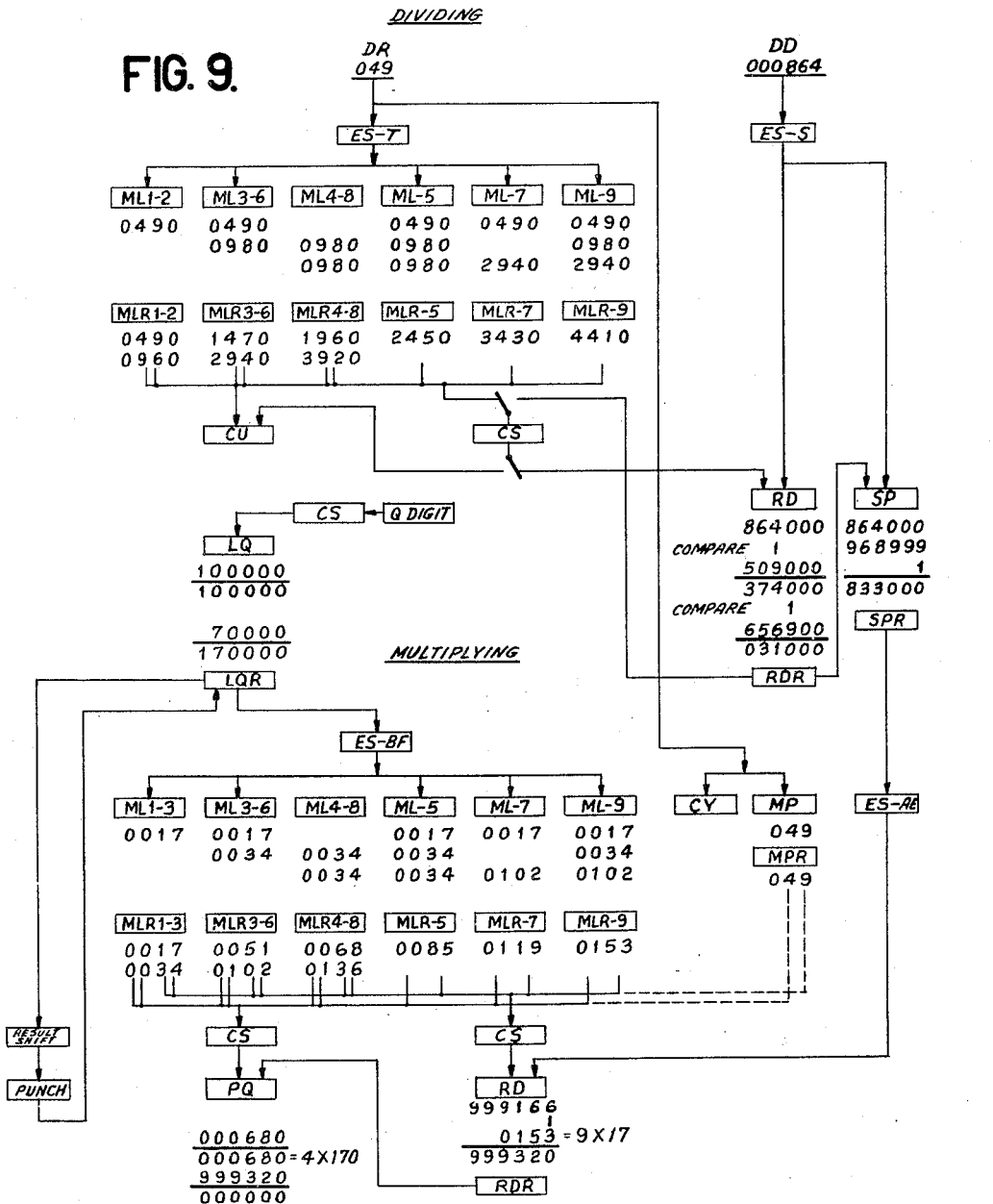
Fig. 9 shows the flow diagram of a typical computation performed by the machine. This shows an illustrative problem and the manner of effecting entry into the various receiving devices and how the machine performs the different typical computations.

In setting up the machine for checking results of dividing computations by multiplying, the universal plugboard is provided with the plug connections shown in Fig. 7. Fig. 9 outlines the procedure followed in checking operations of the type just described.

Checking operations are automatically accomplished without re-running the cards through the machine and as outlined in Fig. 9 the quotient amount derived from the dividing operation is utilized as the multiplicand and is read into the ML accumulators and multiples thereof are built up as in regular multiplying operations. The divisor amount is utilized as a multiplier, and accordingly, is entered in the MP accumulator. The dividend amount is entered into the RD and SP accumulators but in the event that the previous dividing operation should wind up with a remainder, this amount is read from the RD accumulator and subtractively entered in the SP accumulator. The amount now in SP should equal the product in PQ derived by multiplying and is checked before the quotient is recorded.

Having briefly outlined how the machine functions to perform the above calculations and verification of the recorded results, there will now be given a detailed description of the operation of the machine taken with particular reference to the wiring diagram shown in Figs. 2a to 2k, appropriate headings being used for subdivision of the subject matter explained.

On the circuit diagram (Fig. 2d) the reference numerals 313 refer to the accumulator magnets, that is 313ML (Fig. 2d) refers to the accumulator magnets of the multiple receiving devices, 313SP (Fig. 2h) refers to the accumulator magnets of the SP accumulator, etc. At this point, it may be explained that the multiple receiving devices are commonly used for both multiplying operations and dividing operations. In multiplication, these multiple receiving devices are used to build up and store nine different multiples of the multiplicand and on division the same multiple receiving devices are used to build up and store nine different multiples of the divisor. The multiple receiving devices have been previously described. These are in the form of electrical controlled accumulators with electrical readouts. The ML1—2, the ML3—6 and the ML4—8 receiving devices are provided with doubling readouts in addition to the usual straight readouts. The other multiple receiving devices are provided with straight readouts only. On the entry portion of the feed cycle as explained, the amount of the divisor is entered into the five of the multiple receiving devices concurrently.

Figure 2D:
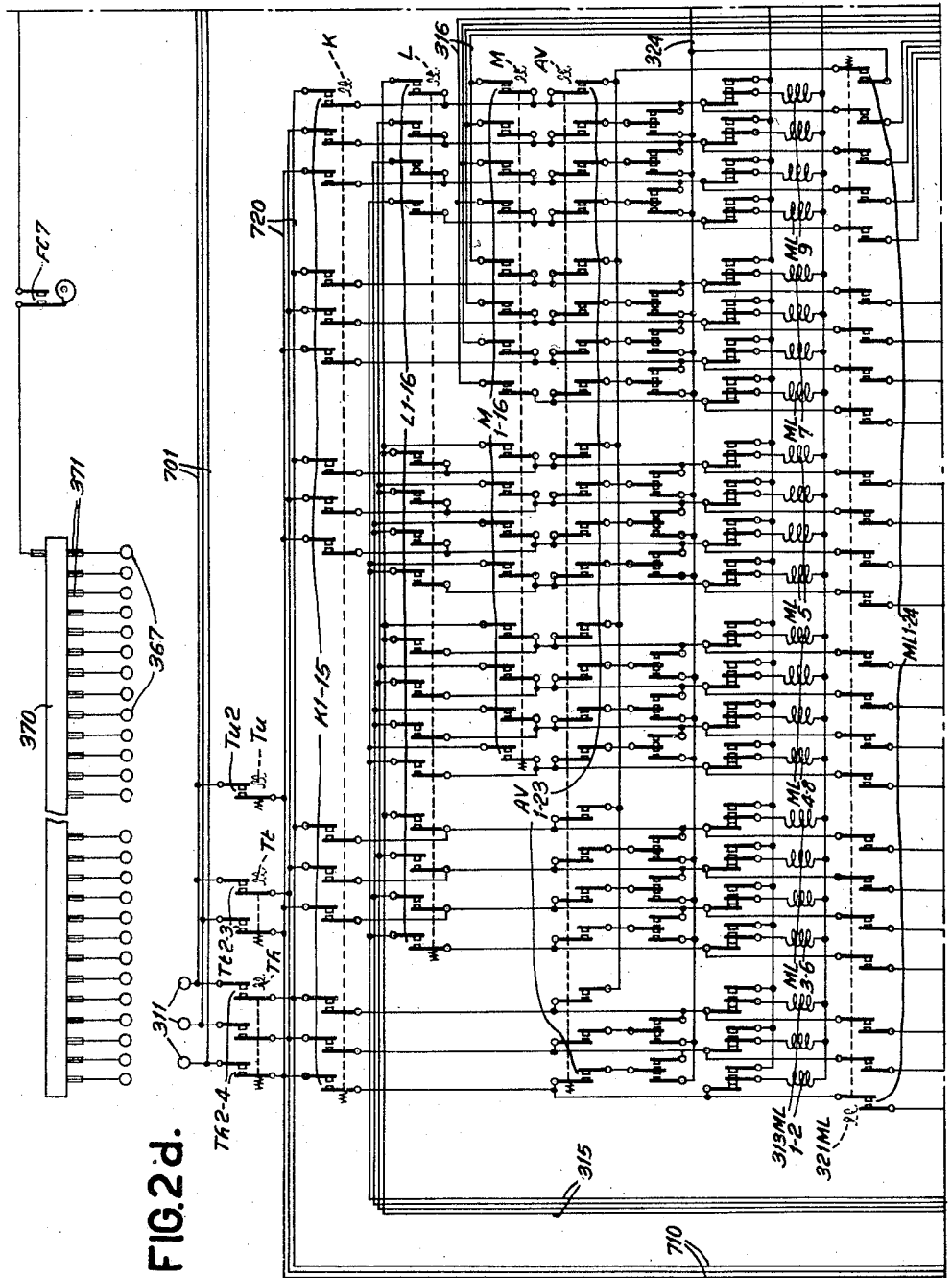
Figure 2F:
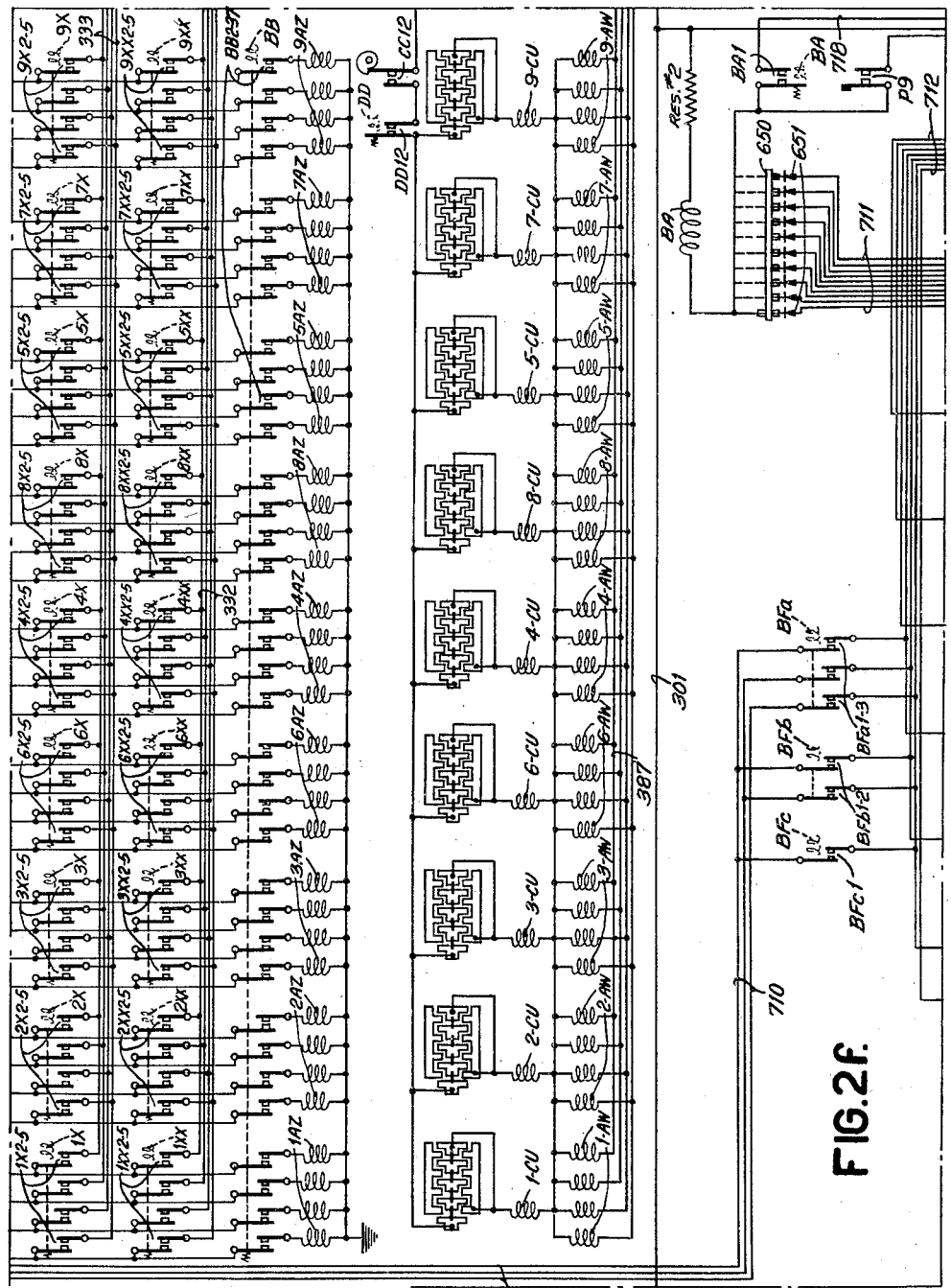
Figure 2K:
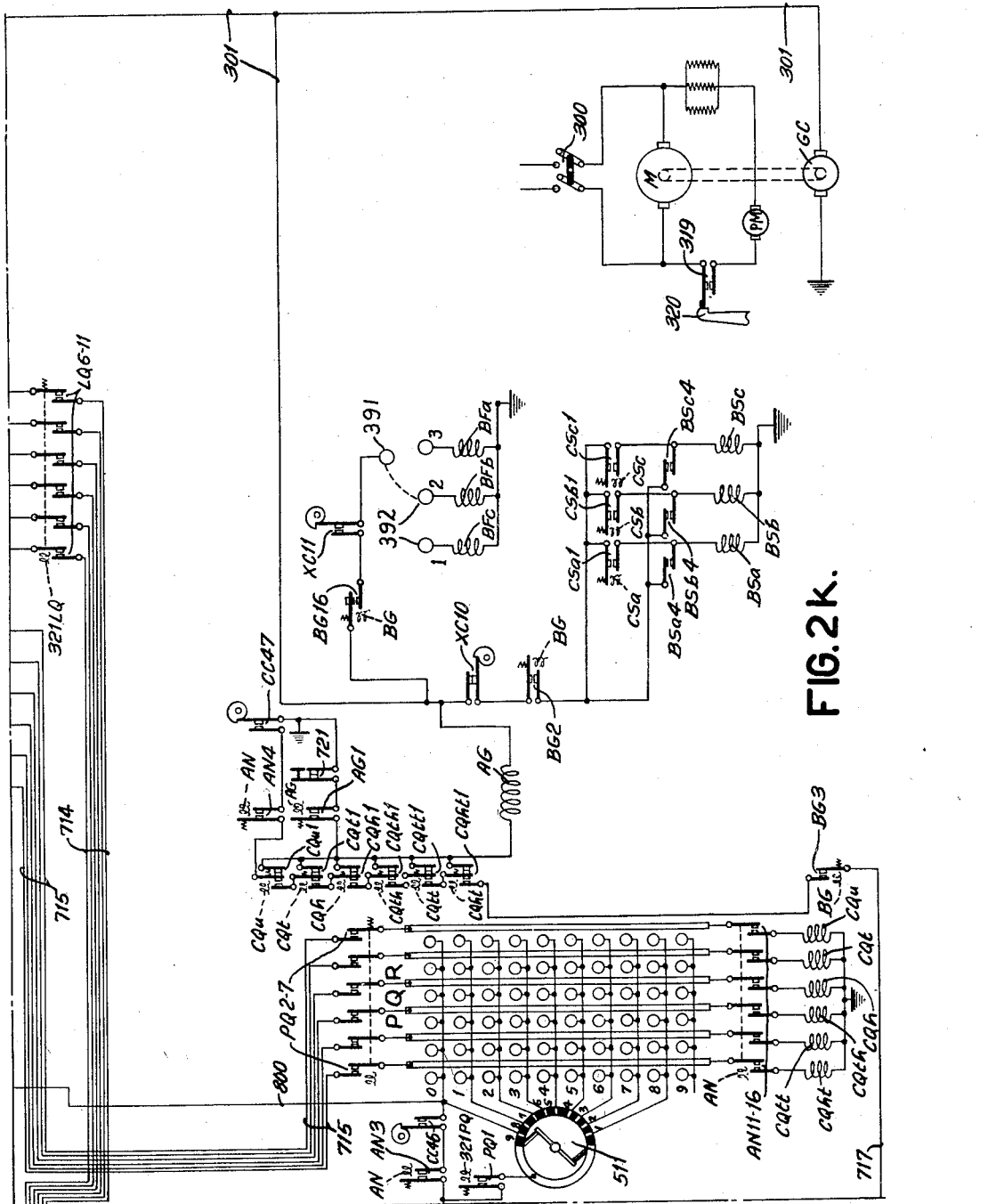

Assuming that a set of record cards is in place in the supply magazine in the machine the operator then closes line switch 300 (Fig. 2k). Closure of switch 300 starts the main drive motor M in operation. Coupled to the main drive motor M is a grounded direct current generator GC which supplies current to the line 301. The operator now depresses start key 302 (Fig. 2b) and a circuit is completed from ground through the E relay coil through the start key 302, through the normally closed F1 contact, through FC3 to line 301. The relay coil E being energized is maintained energized by a stick circuit through the relay contacts E1 and cam contacts FC2. The energization of relay coil E closes relay contacts E2 and a circuit is completed from line 301 through CC29, through P1, through E2, through JJ2, through the stop key 303, through the card feed clutch magnet 304, through the closed points of D1 to ground.

During the first machine cycle of the first card feed cycle, cam contacts FC14 close (Fig. 2c) to send an impulse to the reset magnets 321 for the N—R, electromechanical relay units, to reset them and clear the previous setting, to thereby condition them to receive a setting under control of the first card fed. The card is now fed by the card feeding and handling section of the machine (Fig. 11 of Patent No. 2,315,686) and is advanced toward the reading brushes in the usual way. In starting up the machine for the run of cards, the start key must be maintained depressed for two card feed cycles, or it may be depressed and released and redepressed. Late in the second machine cycle of the card feed cycle, the card lever contacts 305 (Fig. 2b) close bringing about an energization of relay coil G. Energization of relay coil G brings about closure of relay contacts G1 (Fig. 2h) which affords current supply through the FC6 cam contacts to the circuit breaker 306 from which current impulses flow to the card transfer and contact roll 307. The usual regular reading brushes 308 are provided which are connected to plug hubs generally designated 309. Closure of G1 contacts also affords current supply through FC7 (Fig. 2d) to the contact roll 370 when FC7 is closed for sensing of zeros. Shortly after the card lever contacts 305 close, a circuit is completed through G1 contact through FC7, the contact roll 370, brushes 371 to plug hubs 367.

The energization of relay coil G also causes the relay contacts G4 (Fig. 22b) to become closed. When CC29 closes at the end of the second machine cycle of the card feed cycle, a circuit will be established not only to the card feed clutch magnet 304 in a manner previously traced, but a branch circuit will be established through G4 contacts, through the contacts AF5 now in the position shown, to the clutch control magnet 312, to ground. This clutch magnet releases for rotation the group of XC cams which, upon release, function for three machine cycles.

During the first machine cycle of the operation of the XC cams, cam contacts FC14 close to energize the reset magnets 321 for the N—R electromechanical relay units to again enable them to be set up.

In carrying out dividing computations, the quotient derived and the related remainder can be either a whole number or a decimal, depending upon the decimal point location of the dividend and the divisor. Therefore, the result recording will be punched on the record at predetermined denominational columns and the digits will be recorded to the right or left of the decimal point which is identified in the series of plug hubs 355 (Fig. 2g) and the plug hubs 356 (Fig. 2h) by a dotted line DP. Digit recording to the right of the dotted line will indicate decimal values and digits punched at the left of such lines will be whole numbers. However, in checking operations, such values are treated as whole numbers irrespective of the decimal point location of the results. In accordance with this, the present machine provides means to shift the entries in the ML, SP and RD accumulators. Accordingly, with respect to the dividend amount, a denominational shift takes place so that the dividend amount will be entered in the RD and SP accumulators in proper denominational orders. The remainder, it will be noted from Fig. 9, is not shifted denominationally but the subtractive entry in SP of the remainder in RD will be made in the proper denominational orders of the SP accumulator because of the common initial shift for RD and SP. A denominational shift is also effected for entry of the amount now in SP into the RD accumulator, and also for the quotient entry so that it will be entered in the proper orders of the ML accumulators, enabling the building up of multiples in the proper denominational places.

As has just been stated, the machine is provided with means to effect the denominational shift of the entries in RD and SP and such means will now be described. At the outset, it will be noted that with particular reference to Figs. 7 and 2b that a plug connection is made between the plug hubs 364 and 382, thereby causing the energization of relay BG. The BG relay shifts all its contacts from the reverse position shown in the drawings. Therefore, it will be noted that as long as the plug connection is made, the BG relay will remain energized and all of its contacts will be operated.

It will be recalled that the brushes 371 (Fig. 2d) are the pre-sensing brushes, and by such analyzing brushes the divisor and dividend values on the card are pre-sensed to determine the presence of zeros at the left of the first significant digit in both the divisor amount and the dividend and a denominational shift is made accordingly. From the plug hubs 367 of the divisor amount field there are plug connections to the plug hubs 383, as is also shown in Fig. 7; and also with reference to this figure there are plug connections from the plug hubs 367 of the dividend representing field to plug hubs 384. The plug hubs 383 and 384 are also shown in Fig. 2h and by means of the plug connections and the circuit now to be described in detail, the R relays and N relays will be selectively energized. When the card passes the analyzing brushes 371, cam contacts FC7 (Fig. 2d) will be closed at the time the zero position of the card passes the brushes, thereby closing a circuit from the line 301 through G1 (Fig. 2h) contacts now closed, to cam contacts FC7 (Fig. 2d), contact roll 370, analyzing brushes 371, plug hubs 367, by the plug connections previously described to plug hubs 383, to the R relays (Fig. 2d) and then to the ground. Since there is one zero at the left of the divisor value (049) in the problem adopted, relay Rh will be energized. The circuit just described will also effect the energization of the N relays because of the plug connections between the plug hubs 367 associated with the dividend field and the plug hubs 384 and since in the dividend value (000864) there are three zeros at the left, relays Nth through the Nht will be energized. The respective relay contacts will be closed and latched closed since N and R are electromechanical relay units.

As previously stated, the BG relay is energized so that when cam contacts FC13 close a circuit is completed from line 301, through cam contacts FC13 (Fig. 2b), through the transferred BG17 contacts, through relay AK to ground. The stick circuit is provided by AK5 contacts, and goes back through the AF3 contacts now closed, to line 301. Thus, the AK relay is energized during the dividing operation and such energization takes place during the first machine cycle of the card feed cycle.

Relays Nth through to Nht will be energized and transfer their contacts so as to effect the closure of a circuit during the next card feed cycle from the ground, through G2 contacts now closed (Fig. 2i), cam contacts FC11, through AK9 contacts now closed, serially through the transferred contacts Nhtl through to Nthl, normal Nhl contacts, to the relay Sh, thence to line 301. The energization of the relay coil Sh will cause the closure of contacts Sh2—4, (Fig. 2h).

In also referring to Fig. 2i, a circuit is also closed from cam contacts FC11 through the transferred Rh1 contacts, Rt1 contacts in normal position, to relay coil Tt, to line 301. The relay Tt will cause the closure of its contacts Tt2—3 (Fig. 2d). The Tt relay will also cause closure of Tt1 contacts and upon closure of cam contacts XC4 (Fig. 2i) a circuit will be closed from ground through XC4 contacts, Tt1 contacts to Wt relay coil, BG12 contacts now closed, to line 301. The stick circuit for relay Wt is through Wt1 contacts, through cam contacts FC5 to ground.

A circuit is also closed from cam contacts XC4, through relay contacts Sh1, relay coil Vh, through contacts BG12 now closed, to line 301, the stick circuit being through relay contacts Vh1, cam contacts FC5 to ground. Relay coil Vh now being energized will close its Vh2 contacts (Fig. 2i), the latter remaining closed due to the maintained energization of relay coil V.

Figure 8:
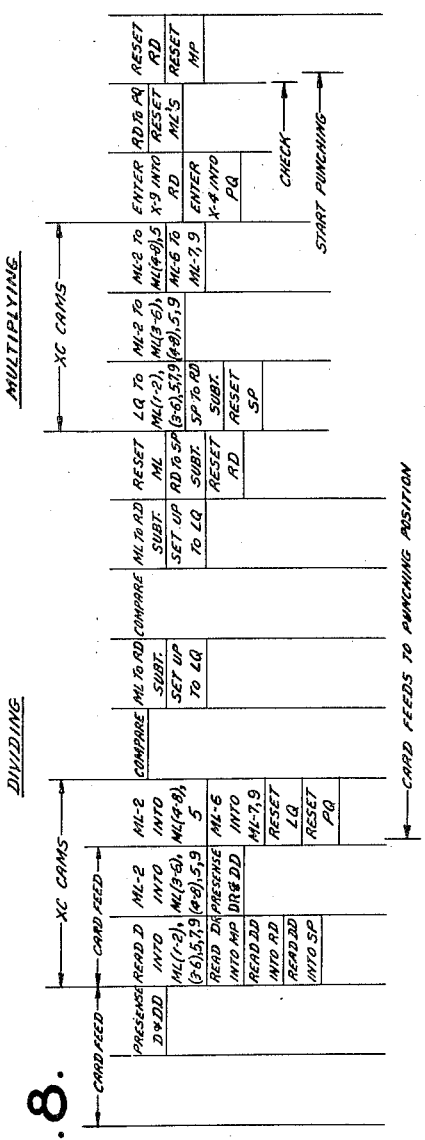
Fig. 8 is a sequence of operation diagram for the calculation which the machine is adapted to perform. These diagrams show the successive cycles of operation for these different computations.

The above-described pre-sensing and relay setup operations take place during the second machine cycle, as is indicated in the timing diagram of Fig. 8. During the next machine cycle or the third machine cycle from the start, the sensing brushes 308 sense the dividend and divisor values and these values are denominationally entered in the respective accumulators in a manner now to be described in detail.

Referring to Fig. 7, it will be observed that certain plug connections are made between the plug hubs 309 connected to the analyzing brushes 308 and other plug hubs to be mentioned as the description progresses.

Suitable plug connections are made between the plug hubs 309 associated with the divisor representing card field and the plug hubs 311. The entering circuit for entering the divisor amount in the ML accumulators is as follows: line 301 (Fig. 2h), through contacts G1, through cam contacts FC6, through the circuit breaker 306, through the contact roll 307, brushes 308, plug hubs 309 and then by the plug connections just described to the plug hubs 311 (Fig. 2d), then through the closed contacts Tt2—3 now closed, through the K1—15 contacts to the 313ML1—2 accumulator, and also to the 313ML3—6, 313ML5, 313ML7 and the 313ML9 accumulators. In accordance with the closure of the contacts Tt2—3, the divisor entry will be shifted in such accumulators with the units digit of DR entered in the tens order accumulator element of these accumulators. Thereafter multiples of the divisor are built up in a manner which will be later explained in detail.

The dividend amount analyzed by the brushes 308 is entered in the SP and RD accumulators by effecting plug connections between the plug hubs 309 of the dividend representing field (see Fig. 7) to the plug hubs 500. The plug hubs 500 are shown in Fig. 2h. The impulses representative of the digits of the dividend are transmitted through contacts Sh2—4 (Fig. 2h) to the 313SP accumulator magnets. This will effect the entry of the dividend amount into the SP accumulator in proper denominational position, or shifted to the extreme left, as is evident from Fig. 9.

My means of the wire connections 702, 703, (Figs. 2h, 2i) these impulses are also directed through relay contacts AEf1—6 normally closed, thence by lines 707 (see Fig. 2j) through relay contacts AJ1—6, to the 313RD accumulator magnets, thus entering the dividend amount in the RD accumulator at the extreme left (see Fig. 9). The contacts AJ1—6 just referred to have been previously closed in the following manner. Referring to Fig. 2c with BG7 contacts transferred by the energization of relay coil BG as stated, a circuit is closed from line 301, through the BG7 transferred contacts, the relay contacts MP5 now closed, to the AJ relay coil, to ground. In this manner relay AJ is energized when the plug connection is made to energize BG relay coil and is maintained energized until the cycle when MP reset takes place.

The divisor is entered in the MP accumulator as follows: From Fig. 7 it will be observed that plug connections are made between the plug hubs 309 related to the divisor representing field and the plug hubs 311. Plug hubs 311 are shown in Fig. 2d and impulses representative of the divisor amount are transmitted through lines 701 (Fig. 2h), the BG8—10 contacts, through contacts MP7—9 in the position shown, to the 313MP accumulator magnets, to ground. Impulses are also directed from BG8—10 to the AD or multiplier cycle controller relays to selectively energize ADu—ADh relays according to the size of the DR.

During the fourth and fifth machine cycles there is effected the building up of the multiples into the various ML readouts which is a prerequisite to dividing operations.

*Buildup of multiples of DR amounts*

It has been previously explained that on the entry cycle the divisor amount was entered into ML1—2, ML3—6, ML5, ML7 and ML9. During the machine cycle following the entry cycle, there occurs the first step in the buildup of further multiples. As stated, the ML1—2 receiving device is provided with a doubling readout. This is designated ML1—2 on Fig. 2e. In the second machine cycle of the operation of the XC cams, cam contacts XC2 (Fig. 2b) close, energizing relay coil L. With relay coil L energized, relay contacts L1—16 (Fig. 2d) are closed and current supply is afforded through the adding emitter 314 (Fig. 2e) as follows: From line 301, through the normally closed contacts MM1, through the normally closed MP10 contacts, through the normally closed contacts ML28, through emitter 314. By this emitter, the impulses flow over to the transverse busses of the doubling section of MLR1—2, down through the piloting section of this readout and out via a group of lines generally designated 315. From these lines, the impulses flow through the L1—16 contacts (Fig. 2d) which are now closed, and ultimately reach the ML3—6, ML4—7, ML5 and ML9 accumulators or multiple receiving devices. This operation will have completed the buildup of the "three" multiple in ML3—6.

In the following machine cycle, cam contacts XC3 (Fig. 2b) close energizing relay coil M and causing closure of relay contacts M1—16 (Fig. 2d). With the emitter 314 in operation the "two" multiple of the multiplicand is read out from the MLR1—2 and is transmitted via lines 315, through the M1—8 contacts to the ML4—8 and the ML5 accumulators. This will have completed the building up of the "four" and "five" multiples in these receiving devices. During the same cycle in which these multiple entries are being made, the "six" multiple of the divisor is read out of the doubling readout section of MLR3—6 and such "six" multiple is transmitted via lines 316, through the M9—16 contacts, and finally reaches the ML7 and the ML9 receiving devices. This operation will have completed building up of the "nine" multiple in ML9 and the "seven" multiple in ML7. The multiple building up operations are now completed.

During the entry cycle, controls are set up to cut off the start key control circuit and to also maintain operation of the machine under record card control. Referring now to Fig. 2b, early in the entry cycle, cam contacts FC4 close energizing relay coil F as follows: Line 301, through card lever contact 305, through FC4, through relay coil F to ground. Relay coil F being energized, it is maintained energized by a stick circuit which is completed through contacts F1 and cam contacts FC3. The shift of the F1 contacts cuts off the circuit to the start key contacts 302. Energization of relay coil F closes contacts F2 to maintain a stick circuit for relay coils F and G either through FC3 or the card lever contacts 305.

*Reset PQ and LQ*

During the second machine cycle of the card feed cycle, the record card from which the factors were read is advanced to the punch tray in the usual manner. Upon reaching this tray the contacts 311 (Fig. 11 of Patent No. 2,315,686) close to energize relay coil D (Fig. 2b). The energizing of relay coil D shifts relay contacts D1 to a reversed position from that shown, opening the circuit through the card feed clutch magnet 304 and completing a circuit for the punch rack trip magnet 318, upon closure of cam contact CC1, with contacts P3 and the relay contacts B1 closed. The relay contacts B1 become closed upon energization of relay coil B, which is energized upon closure of the customary last column punch contacts P5, since contacts AG4 are now closed. Closure of contact B1 closes a circuit to the card eject magnet 361, also shown in Fig. 10. With the punch rack trip magnet 318, energized, contacts 319 (Fig. 2k) become closed and remain latched closed in the customary manner by latch 320 (Fig. 2k). The current supply is then provided for the punch driving motor PM, endwise card feed occurs in the usual way to feed the card to the R1 position (Fig. 10 and Fig. 10a) in a manner to be later described.

In the manner described, contacts B2 and D2 (Fig. 2b) will be closed and a circuit will be closed as follows: Line 301, through cam contacts CC27 (Fig. 2c) through contacts HH2 now closed, thence through contacts D2, through contacts B2, through the relay coils 321PQ and 321LQ, to ground. The energization of 321LQ closes its stick contacts LQ1, setting up a stick circuit for itself and 321PQ back through cam contacts CC5 to line 301.

Upon energization of the 321LQ relay, contacts LQ6—11 (Fig. 2k) LQ12 (Fig. 2j) are closed. Contacts LQ4 are also closed, affording current supply from line 301, through LQ4 (Fig. 2g) to the emitter 414. The emitter 414 is wired complementary to the LQR readout, thus complemental impulses representative of the 9's complement of the amount standing in LQ flow via lines 712, connecting lines 713, 714 (Fig. 2k) over through the now closed LQ6—11 contacts, through 313LQ accumulator magnets (Fig. 2j), to ground. By thus introducing the 9's complement of the amount standing in LQ, the LQ accumulator elements are restored to a "9" position. To bring the accumulator to zero from the all "9" position, an elusive one is entered in the units order at the carry time in the cycle. This entry is provided through the LQ12 contacts (Fig. 2j) which are closed in a manner previously explained. This impulse is supplied in the following manner. From line 301, through CC16 (Fig. 2j), wire 324 transmitting this impulse at the carry time, through the LQ12 contact, through the normal carry relay contacts AV44 controlled by the relay coil AV, to the units order of the 313LQ magnets. The units order is thus advanced one step and the electrical transfer devices of the accumulator cause advance of all the higher orders one step.

It may be explained that as long as the machine is operating, cam contacts CC2 (Fig. 2b) close once each machine cycle at the carry time in the operation of the accumulators. Such closure of cam contacts CC2 energizes relay coil AV. The energization of the coil AV closes all of the associated AV relay contacts. Since coil AV becomes energized once each machine cycle, the aforementioned relay contacts thus close at the carry time. The closure of these contacts permits the electrical carry devices to be effective for performing carry operations whenever they are required in their related accumulators.

The energization of 321PQ closes contacts PQ1 and PQ2—7, both of which are shown in Fig. 2k. This will cause the reset of the accumulator PQ in the fifth machine cycle as is indicated in the diagram of Fig. 8. The resetting of the PQ accumulator is effected in the usual manner, that is, by the emitter 511 (Fig. 2k) complementary impulses are directed under control of the readout PQR through contacts PQ2—7 now closed, wires 715 to accumulator magnets 313PQ (Fig. 2j). This will clear the PQ accumulator of any amount previously entered therein so as to condition it to receive product entries of the subsequent multiplying operation. PQ8 is also closed at this time, and therefore, at the carry portion of the cycle a carry or an elusive one impulse is entered from line 324 through contacts PQ8, through contacts AV38, through the units order 313PQ accumulator magnet, to ground; thus restoring the units order element to zero, and by means of the usual carry circuits all of the higher order elements of the PQ accumulator are restored to zero.

During the LQ and PQ reset, provision is made to prevent repetition of such reset. This reset preventing means is provided for as follows: During the LQ reset, LQ2 contacts are closed, (Fig. 2c). Accordingly, when cam contacts CC6 close a circuit is completed from line 301 through LQ2, through cam contacts CC6, through relay contacts AK22, through relay coil HH to ground. Relay coil HH becoming energized establishes a stick circuit for itself through HH1 contact and the punch control contact P2 (now closed) back to line 301. The relay contacts HH2 (Fig. 2b) open and thus interrupt the reset initiating circuit to 321LQ and 321PQ.

Referring to Fig. 2c at the left thereof, the closure of contacts LQ2 effected by the energization of 321LQ will close a circuit from the line 301, through LQ2 contacts now closed, through cam contacts CC7, through JJ relay coil to ground. The energization of the JJ relay closes its stick contacts to set up a stick circuit for itself back through JJ1 contacts and MP3 contacts, to line 301. The energization of the JJ relay now initiates dividing operations and such operations will be initiated in the sixth machine cycle in the problem assumed.

Reset of AW and AZ comparing units

The previous energization of the AK relay (Fig. 2b) causes the AK3 relay contacts (Fig. 2c) to close, thus completing a circuit in this cycle through the comparing unit clutch magnet 342 which is maintained energized as long as the AK relay is maintained energized. The maintained energization of the clutch magnet 342 (Fig. 1a) releases a clutch to place the drive shafts 91 of the CU comparing units in timed operation with shaft 50.

At the end of the third cycle of operation, XC9 cam contacts close (Fig. 6) and with relay contacts AK1 (Fig. 2a) now transferred, a circuit will be completed when cam contacts CC9 close from line 301, through cam contacts XC9 (Fig. 2a) now closed, through AK1 contacts now transferred, through cam contacts CC9, to and through the 321AW reset coils, to ground, thus causing the 321AW reset magnets (Fig. 14 of Patent No. 2,315,686) to be energized and the AW side of the comparing units to be reset.

Also upon the previous LQ reset, the LQ3 contacts (Fig. 2a) were closed so that current will be supplied through the cam contacts C17 when they close, through relay contacts LQ3, to the divisor reset coils 321AZ of the divisor comparing units (see Fig. 14 of Patent No. 2,315,686), thereby energizing them during the LQ reset cycle. This will release all the divisor side sections and allow them to be restored to be then in a position to receive a subsequent setting of the divisor multiples thereon.

Dividing operations

The manner in which dividing operations then ensue is similar to that described for dividing mechanism of Patent No. 2,328,610 which can be referred to for details of operation. However, the sequential operations will be briefly described.

With the JJ relay now energized during the LQ reset cycle and the AK relay also energized, upon closure of CC9 cam contacts, (Fig. 2a) a circuit is completed as follows: from the line 301, through the XC9 contacts, through the AK1 transferred contacts, through cam contacts CC9, wire 700, serially through the 9CU1—1CU1 contacts in their normal position, through the JJ4 contacts, through the LL relay coil, to ground. Energization of the LL relay causes LL1 stick contacts to close and complete a holding circuit for itself back through cam contacts CC13 and XC9 contacts, to line 301. Shortly after the LL relay is energized, cam contacts CC14 close and complete a circuit to the 340SB stepping magnet. Energization of the stepping magnet 340SB causes the related switch arms SB1, SB2, SB3, SB4 to be advanced to the first contact position. With LL2 contacts closed, upon closure of cam contacts CC11, a circuit is completed to the BB and DD relay coils by the switch arms SB3 and SB4. Energization of the BB and DD coils set up a holding circuit for themselves by means of their associated BB1 and DD1 stick contacts back through cam contacts CC10, through the Y2 contacts, to line 301. Energization of the BB relay causes closure of the BB2—37 contacts (Fig. 2f) thus allowing the multiples of the divisor amount to be set up in the AZ side of the comparing unit. The setup of the multiples of the divisor on the AZ side of the comparing unit sections will now be described.

It has been previously explained how relay coil BB (Fig. 2a) becomes energized. With such relay coil energized, all of the contacts BB2—37 (Fig. 2f) become closed. The add emitter 314 (Fig. 2e) is placed in the circuit in the following manner: From line 301 through the non-shifted MM1, MP10, ML28 contacts, to the emitter 314. Such add emitter will transmit impulses to and through all of the MLR readout devices and the multiple amounts available on such readouts will be individually transmitted through the now closed BB2—37 contacts, to the various divisor multiple comparing magnets 1AZ, 2AZ, 3AZ, etc. It will be understood that the divisor multiple side of the comparing units will receive setting of the different divisor multiples. The comparing units operate in a well known manner to make suitable settings of the brushes upon these comparing conductors.

Upon closure of cam contacts CC8, a circuit is completed through the CSa relay coil (Fig. 2a) as follows: From line 301, through the Y2 contacts, through the CC8 cam contacts, through switch arm SB2 at the first contact position, through the CSa relay coil to ground. A dividend comparison portion of the amount standing in the RD accumulator is then entered into the AW side of the comparing unit in the following manner: From line 301, through the normally closed contacts RD2, (Fig. 2j) to the emitter 348, thence through the readout RDR, through the normally closed contacts of RD3—8, through the now transferred DD6—11 contacts, through the now closed CSa2—4 contacts, through the transferred DD2—5 contacts, wires 387 (Fig. 2f) of the AW coils of the comparing unit. Thus the same dividend comparison amount is set up in all sections of the AW comparing unit. Comparison is then made against the multiples of the divisor which are set up in the AZ side of the comparing unit, upon closure of cam contacts CC12, (Fig. 2f). When cam contacts CC12 close, one or more of the CU relays (Fig. 2f) will be energized, depending upon the largest digital multiple divisible into the dividend comparison amount entered into the AW side of the comparing unit, thus transferring their associated CU1 contacts (Fig. 2a). When cam contacts CC9 (Fig. 2a) again close a circuit is completed from line 301, through cam contacts XC9, through AK1 transferred contacts, through cam contacts CC9, through the normal CU1 contacts to the first transferred CU1 contacts and in the problem which is shown in Fig. 9, the first comparison operation causes the 1CU relay to be energized and thus only the 1CU1 contacts will be transferred, and the circuit will then be through the 1X relay coil, through the MM relay coil, to ground.

After comparison is made with one dividend comparison portion, at the time the multiple selecting relays are energized under control of contacts CC9, a supplemental circuit is established through AK1 now transferred, CC9 to reset coils 321AW to ground. These coils are the reset coils of the comparing unit corresponding to the comparison portion of the dividend.

Energization of the 1X relay coil sets up a holding circuit for itself by the closure of 1X1 contacts back through cam contacts CC15, to line 301. During the next multiple deducting and quotient entering cycle, due to the fact that the LL relay is not energized in this cycle, the BB and the DD relays are, likewise, not energized. The "going" multiple of the divisor is now subtracted from the RD accumulator in the following manner: With the MM relay energized, MM1 contacts (Fig. 2e) are transferred and with the 1X relay energized, the 1X2—5 contacts (Fig. 2f) are closed. Thus, complemental impulses are sent to the 313RD accumulator magnets in the following manner: From line 301, through the transferred MM1 contacts and by the emitter 344, complemental impulses are then sent under control of the MLR1—2 readout, through the 1X2—5 contacts (Fig. 2f) thence by a group of lines 333, through the normally closed DD2—5 contacts (Fig. 2j) through the CSa2—4 contacts, through the normally closed DD6—11 contacts, thence over a group of wires 709 to the corresponding 313RD accumulator magnets. The elusive one is entered into the proper order 313RD accumulator magnet as follows: From line 301, through cam contacts CC16 (Fig. 2j) through contacts MM2 now closed, to contacts AK11 now transferred, through contacts CSa10 now transferred, down through the associated 313RD accumulator magnet to ground.

Since the "going" multiple is "1," the 1X6 contacts (Fig. 2j) are closed so that a unit impulse will be directed by means of the emitter 348 through AK10 contacts now closed, through the AL8 contacts in the position shown, through CSa9 contacts to the highest order 313LQ magnet, thus entering the first quotient digit "1" in the LQ accumulator.

When cam contacts CC9 again close, the circuit through the LL relay (Fig. 2a) is again completed and energization of the 340SB stepping magnet is again effected, causing the related switch arms to be moved to their second contact position. When cam contacts CC11 close, this time only, the DD relay is energized, thus setting up the circuits to read a new dividend comparison from the RD accumulator into the AW side of the comparing unit. When cam contacts CC8 close, a circuit is completed through the CSb relay to ground. Energization of relay CSb causes the CSb2—5 relay contacts (Fig. 2j) to close and the circuit to enter this new dividend comparison amount into the AW side of the comparing unit is the same as previously described except that impulses are directed through the CSb2—5 contacts this time, instead of the CSa2—4 contacts.

After the second successive comparing and quotient entering and multiple deducting cycles, LL relay is energized and a circuit is completed upon closure of cam contacts CC17 through the Y relay (Fig. 2a) as follows: From line 301, through cam contacts CC17 (Fig. 2a) through relay contacts LL3 now closed, through the switch arm SB1 at the second contact position, thence by means of a plug wire from the "2" plug hub 390 to the plug hub 389, through the Y relay coil, to ground. Energization of the Y relay completes a holding circuit for itself back to line 301 through the Y1 relay contacts and through MP4 contacts. The plug connection between 389 and 390 is shown in Fig. 7 and is made in accordance with the number of quotient digits desired.

With the Y relay energized, Y7 contacts (Fig. 2c) are closed and when the CC27 cam contacts close, a circuit is completed from line 301, through contacts AF4, through contacts Y7, through the now transferred AK6 contacts, through 321ML relay coil to ground. Also from Y7 contacts a circuit is completed through the AK8 contacts now transferred, through 321RD relay coil to ground, thus causing the RD and the ML accumulators to be reset in the next cycle in the manner fully described in the parent application, Serial No. 430,324.

The energization of the relay coil Y will have shifted relay contacts Y3 (Fig. 2a) to a reverse position from that shown at a time prior to the closure of cam contacts CC14. Accordingly, with such CC14 contacts closed, a circuit is completed through the now shifted contacts Y3, through the 341SB restoring magnet. With the type of stepping switch utilized and which is well known, this will release the stepping switch arms and allow them to return to the normal position shown in the circuit diagram. It may be noted that no circuits are inadvertently established to the stepping switch arms SB upon restoration because on restoration the Y2 contacts (Fig. 2a) are in open position. The foregoing restoration of the stepping switch and opening of contacts Y2 terminate further energization of the CS magnets, the BB and the DD magnets.

RD to SP subtract

During the reset of the RD accumulator, the remainder amount -31- in Fig. 9 in the RD accumulator is entered into the SP accumulator as a tens complement. In other words, the remainder is subtracted from the dividend amount standing in the SP accumulator in the following manner: From line 301, through the now transferred RD2 contacts (Fig. 2f), to the complemental emitter 350, thence under control of the RDR readout through the now transferred RD3—0 contacts, thence by lines 709, through the AJ1—6 contacts now closed, lines 707 (Fig. 2i) through the AE1—6 contacts, lines 703, 702 (Fig. 2h) through the 313SP accumulator magnets to ground. The elusive "one" entry is effected by the impulse from line 324 (Fig. 2h), through RD10 contacts, through AK19 contacts now closed, BG20 contacts now closed, AV32 contacts to the units order 321SP magnet.

Multiplying operations for checking dividing operations before quotient is recorded The dividing operations which have been briefly described but which are more fully described in the parent application Serial No. 430,324 and Patent No. 2,328,610 are now completed. The quotient result -17- is in the LQ accumulator, the remainder has been subtracted from the dividend amount in SP which gives the balance of -833000- and the machine is now automatically conditioned for checking the result of the dividing computation just completed by a subsequent multiplying operation. The quotient amount -17- is used as a multiplicand and digital multiples of this amount, therefore, are entered into the ML units but denominationally shifted. This is accomplished in the following manner: During the resetting of the ML accumulator in the previous cycle, the ML26 contacts (Fig. 2b) are closed and upon closure of cam contacts CC42 (Fig. 2b), a circuit is completed from line 301, through cam contacts CC42, through relay contacts H2 and/or KK2, through contacts ML26, through AF relay coil, to ground. The energization of the AF relay coil completes a holding circuit for itself back through stick contacts AF1, cam contacts CC43, to line 301. AF relay opens AF3 contacts to break the stick circuit AK relay to deenergize the latter during the multiplying operation.

With AF relay energized, as previously described, the AF6 contacts (Fig. 2b) are transferred and when cam contacts CC29 close, a circuit is completed from line 301, through the transferred AF6 contacts, through 312 clutch control magnet coil to ground, thus initiating an XC cam cycle which consists of three machine cycles.

Prior to starting the machine in operation, a plug connection is made between a plug socket 391 (Fig. 7) and one of the plug sockets 392 marked 1, 2, 3, corresponding to the number of quotient digits to be computed, and should correspond to the number of the plug socket 390 received by the plug connection made between it and plug socket 389. This setup is made so that a denominational shift can be made between the LQ accumulator and the ML receiving devices so that the first significant digit will be entered into the ML accumulators in the proper orders.

LQ to ML (1—2), (3—6), 5, 7, 9

During the first machine cycle in the operation of the XC cams, cam XC7 (Fig. 2b) closes, completing a circuit from line 301, cam contacts XC7, BG5 contacts now transferred, Y6 contacts now closed, to AP relay coil to ground. Relay coil AP closes its contacts AP1 (Fig. 2g), connecting the add emitter 322 to the line 301.

In the present example, two quotient digits are to be computed and the quotient amount is represented in the readout LQR as -170000-. Since two quotient digits are to be computed, the entry shift relay coil BFb is energized by a circuit closed from line 301, (Fig. 2k), BG16 contacts now closed, cam contacts XC11, plug socket 391, plug connection to the "2" plug socket of the group 392, relay coil BFb to ground. The latter closes its contacts BFb1—2 (Fig. 2f), effecting a denominational shift. Impulses directed from line 301, AP1 contacts now closed, emitter 322 through and under control of LQR are transmitted through contacts BFb1—2, by lines 710 (see Fig. 2d) to lines 720, through contacts K1—15 to the proper ML313 accumulator magnets of the ML (1—2), (3—6) 5, 7 and 9 receiving units. Thus, each unit receives the computed quotient amount, the necessary denominational shift being effected by the selective energization of the BF relays and positioning of their contacts. In the present example -17- is at the two extreme left hand orders in LQR and by the denominational shift -17- is entered in the tens and units orders, respectively of the above mentioned ML receiving units, as is obvious from Fig. 9.

Reset SP

During the first cycle of the operation of the XC cams, the SP accumulator is also reset and concurrently the amount thereon is transferred to the RD accumulator.

With the AF5 contacts closed, a circuit is completed through relay coil 321SP (Fig. 2b) when cam contacts CC27 closes as follows: Line 301, through cam contacts CC27, through relay contacts AF5, through relay coil 321SP to ground. The energization of the 321SP relay sets up a holding circuit for itself back through stick contacts SP1, through cam contacts CC5, to line 301 and causes a reset of the SP accumulator. The resetting of the SP accumulator is effected by a circuit as follows: From line 301, through SP11 contacts (Fig. 2i), to the emitter 375, thence under control of the SPR readout impulses are sent through the SP4—9 contacts, now closed, thence via a group of lines 704, 702 (Fig. 2h) through the 313SP accumulator magnets, to ground.

Entry shift for SP to RD subtract

When cam contacts XC8 close, a circuit is completed through the AEf relay coil as follows: From ground, through contacts BG15 now closed, (Fig. 2i), through contacts SP16 now closed, through cam contacts XC8, through relay coil AEf, through the previously closed Wt4 contacts, through BSa2 contacts now closed, BSb2 contacts now transferred, BSc2 contacts now normal, through the AEc relay coil, to line 301. Energization of the AEf and the AEc relay coils causes the respective AEf1—6 contacts (Fig. 2i) to open and the AEc1—6 contacts (Fig. 2i) to close. The manner in which contacts BSa2 closed, and BSb2 contacts transferred will now be described.

During the dividing cycles, it will be recalled that CSa and the CSb relays (Fig. 2a) were energized because two quotient digits were computed so that the CSa1 and the CSb1 contacts (Fig. 2k) were closed. As a result, a circuit was completed at this time through the BSa and the BSb relay coils as follows: From line 301, through the XC10 cam contacts now closed, through the BG2 contacts now closed, through the CSa1 contacts, through the BSa relay coil, to ground; likewise through the CSb1 contacts, through the BSb relay coil, to ground. Energization of these two relays BSa, BSb sets up a holding circuit for themselves back through their associated BSa4 and BSb4 stick contacts and shifts their respective contacts shown in Fig. 2i to selectively energize the AE relay coils according to the number of quotient digits computed and also dependent upon the number of significant digits in the DR amount. These jointly determine the required denominational shift in the transfer from SP to RD, as will now be described.

SP to RD subtract

During the resetting of the SP accumulator, complemental impulses are also directed to the RD accumulator from the SP accumulator readout and denominationally shifted so that -833000- in SP appears as a tens complement, -999167- in RDR (see Fig. 9). The resetting impulses pass from the lines 704 previously mentioned to lines 703, through the AEc1—6 contacts now closed, thence by a group of lines 707 through the AJ1—6 contacts now closed, through the 313RD accumulator magnets, to ground.

The required elusive one digit for the RD accumulator is provided by the unit impulse from line 324 (Fig. 2j), through relay contacts SP14 now closed, BG18 contacts now closed, AV50 contacts now closed, to the units order 313RD accumulator magnet, to ground.

Multiplying

In the two ensuing machine cycles, the multiples of the quotient amount are built up in the ML receiving units in the usual manner.

When CC23 cam contacts close and with cam contacts XC9 closed, a circuit is completed as follows: From line 301, through cam contacts XC9, (Fig. 2a) through the normally closed AK1 contacts now normal, through the now closed cam contacts CC28, through the normally closed contacts ML27, through the JJ5 contacts (now closed), through the 340SA stepping magnet, to ground. Energization of stepping magnet 340SA causes the switch arms SA1, SA2 to advance to their first contact position. When cam contacts CC3 and CC26 close a circuit is completed from line 301, through contacts JJ3, through the first contact position of the SA2 stepping switch arm, through ADu5 contacts, line 326, through the CSd relay coil, to ground. A circuit is also completed from the ADu5 contact, to the units order segment of the MPR readout, through the associated brush contacting the 9 segment (because 9 is the units order of 049) through the 9X relay coil, through AK27 contacts, to ground. Energization of 9X relay sets up a holding circuit for itself and the CSd relay, through the 9X1 contact back through cam contacts CC15, to line 301. A circuit is also completed, through cam contacts CC26, the switch arm SA1 at the first contact position, through contacts ADt5, line 327, through the CSc relay coil, to ground. Also from the contacts ADt5 a circuit is closed to the tens ordered segment of the MP readout, through the brush at "4," to the 4XX relay coil, to ground. A holding circuit is set up for the 4XX relay coil back through the 4XX1 contacts, line 330, line 331, cam contacts CC15, to line 301. With the 9X relay energized, the 9X2—5 (Fig. 2f) contacts are closed, and the 9's multiple will be entered into the RD accumulator. The 9's multiple will be read out from the MLR9 and the impulses will flow through the 9X2—5 contacts over a group of lines designated 333, through contacts DD2—5 (Fig. 2j) which are now in the position shown, a group of lines 386, through the CSd2—7 contacts, through the group of contacts DD6—11 in the position shown, via a group of wires designated 709 down through the 313RD accumulator magnets, to ground.

Likewise, with the 4XX relay energized, the 4XX2—5 contacts (Fig. 2f) will be closed and the four multiple will be then entered into the PQ accumulator. (See Fig. 9.) The circuit for entering the four multiple into the PQ accumulator is as follows: From line 301, through the normally closed MM1 contacts (Fig. 2e), the normally closed ML28 contacts, to the add emitter 314, thence through the MLR4 readout section, through the 4XX2—5 contacts, thence via a group of lines 332, through the normally closed AK14—17 contacts, (Fig. 2j), through the CSc2—5 contacts, through the AK18—21 contacts, through the now transferred AL2—7 contacts, wires 708, through the 313PQ accumulator magnets, to ground. The AL2—7 contacts are closed upon energization of the AL relay (Fig. 2c) which is effected by a circuit from ground, relay coil AL, AG3 contacts now closed, A4 contacts now closed, contacts AF7 now closed, and cam contacts CC48, to line 301. The stick circuit for AL is back through AL1 contacts to line 301.

When cam contacts CC28 (Fig. 2a) again close, a circuit is again completed through the 340SA magnet in the manner previously described, causing the stepping switch arms to advance to their second contact position. When cam contacts CC3 close, a circuit is completed through the H and the KK relay coils as follows: From line 301 through cam contacts CC3, through JJ3 relay contacts, through the switch arm SA2, through the transferred ADu4 contacts, through the normal ADh3 contacts, the normal ADtt2 contacts, the normal ADm1 contacts, through the KK relay coil to ground. A circuit is also closed from JJ3 contacts, through cam contacts CC26, through the switch arm SA1, through the transferred ADt4 contacts, through the normal ADth3 contacts, the normal ADht2 contacts, and the normal ADtm1 contacts, through the H relay coil to ground. The energization of the H and KK relays sets up a holding circuit back through their stick contacts H1 and KK1, through MP4 contacts, to line 301.

Reset ML

With the H and KK relays energized, a circuit is now completed through the AM relay (Fig. 2b) as follows: From line 301, through contacts KK3, through contacts H3, through contacts Y5, through the transferred BG4 contacts, through the AM relay coil to ground. A circuit is also completed in the same cycle, through the 321ML and the CA relay coils as follows: From line 301, through cam contacts CC27, through relay contacts AF4, through KK5 contacts, through H5 contacts, through AK7 contacts, through CA relay coil to ground. Also a circuit is closed from H5 contacts, through the normally closed AK8 contacts, through 321ML relay coil, to ground. The energization of the CA relay sets up a holding circuit for itself back through stick contacts CA1, through cam contacts CC5, to line 301. In like manner, a holding circuit is set up for relay coil 321ML, through ML25 contacts. The energization of 321ML causes the ML units to reset.

During the last part of the machine cycle in which the ML receiving units are reset, cam contacts CC28 (Fig. 2a) close, thereby completing a circuit through the stepping relay restoring magnet 341SA as follows: From the line 301, through the now closed cam contacts XC9 which are at rest, through the normally closed relay contacts AK1, through cam contacts CC28, through the now transferred relay contacts ML27, through the restoring magnet 341SA to the ground. As is customary in the type of stepping switches referred to, the energization of the restoring magnet will release the detent and allow the stepping relay contact arms to be restored to normal by means of a previously tensioned coil spring.

RD to PQ

The energization of CA relay causes the CA1—6 (Fig. 2j) contacts to be closed to transfer the amount from the RD accumulator to the PQ accumulator by a circuit as follows: From line 301, through the normally closed points of RD2 (Fig. 2j), to the emitter 348. Impulses are then sent under control of the RDR readout, through the normally closed RD3—8 contacts up through the CA1—6 contacts, wires 708, then through the now transferred AL2—7 contacts, through the 313PQ accumulator magnets to ground, which should bring PQR to zero.

Test PQR for zero setting

When cam contacts CC44 close, (Fig. 2b) a circuit is completed from line 301, through cam contacts CC44, through relay contacts AM1, through the AN relay coil, to ground. Energization of the AN relay coil completes a holding circuit for itself back through the following relay contacts, AN1, Y5, H3, KK3, to line 301. When the AN relay energizes, contacts AN3, AN4, and AN11—16 (Fig. 2k) are closed.

When cam contacts CC46 close, a test impulse is sent to the zero segments of the PQR readout, it being noted that for each order of the corresponding readouts that are at zero setting, a circuit will be completed from line 301, through AN3, CC46 and for each zero setting of PQR through the respective CQ relay coil. The machine now tests through the CQ contacts to determine whether all of the orders of PQR are at zero. This is performed as follows: Upon closure of cam contacts CC47, which close shortly after cam contacts CC46 close, a circuit is completed from ground, through cam contacts CC47, through AN4 relay contacts, serially through the transferred CQ1 contacts, through the BG3 contacts now transferred, wire 717 (Fig. 2g), through the A relay coil to line 301. Energization of the A relay initiates punching of the quotient amount from the LQR readout in the manner fully described in the parent application, Serial No. 430,324. However, if one of the orders of PQR was off a zero position, a circuit would not have been completed through the A relay but to the AG relay coil and as will be described later this will prevent punching operations.

The relay coil A closes its stick contacts A1, the circuit extending back through relay contacts A1, relay contacts LQ5, to ground. Relay contacts A2 are also closed and, since cam contacts CC19 are closed when cam contacts CC47 are closed, a circuit will be completed from line 301, through relay coil AB, relay contacts A2, cam contacts CC19, to ground. Energization of the relay coil AB causes closure of contacts AB1—11 (Fig. 2g) which in turn connects the punch selecting magnets 353 to the LQR readout.

In the problem considered shown in Fig. 9, the Vh relay was energized because of the three zeros at the left of the DD amount, and Wt relay was energized because of the single zero at the left of the DR amount. Relay A (Fig. 2g) is energized to initiate punching, closing its relay contacts A5 (Fig. 2i) enabling a circuit to be closed from ground, through relay contacts A5, relay contacts Vh2, relay coil Zh, to line 301. Relay contacts Zh1 provide the stick circuit for relay Zh.

Likewise, with relay contacts Wt2 closed, a circuit is completed to relay coil AAt, the stick contacts AAt1 providing the stick circuit.

Accordingly, relay coil AAt closes its stick contacts AAt2—13 (Fig. 2g) and relay coil Zh closes its contacts Zh2—13. As is well known, selective energization of the Z and AA relay coils shifts digit recording so that the quotient is recorded with regard to its decimal point. This arrangement is well known in the type of dividing machine illustrated and for this reason is briefly described.

Reset MP and RD

With the AN relay energized, the AN2 contacts (Fig. 2b) are closed and upon closure of cam contacts CC27, a circuit is completed from line 301, through the AN2 relay contacts, through the 321MP relay coil to ground; likewise from relay contacts AN2 through the 321CY relay coil to ground. A circuit is also completed from relay contacts AN2, through the now transferred BG6 contacts, through the AK8 normally closed contacts, through relay coil 321RD, to ground. The energization of 321MP and 321RD relay coils causes reset of the respective MP and RD accumulators. Energization of the 321CY relay causes in the usual manner reset of the multiplying cycle controller unit, that is, the reset of the previously energized AD relays (Fig. 2h). Resetting of the MP accumulator is now effected by a circuit as follows:

Energization of 321MP relay coil closes contacts MP10 (Fig. 2e) and contacts MP7—9, and thus the circuit is closed from line 301, through contacts MM1 now normal, MP10 now closed, to the subtract emitter 344 so that impulses are sent through the MLR units to the respective ML accumulator magnets. In view of the wire connections from the MLR9 readout to the MPR supplemental readout in Fig. 2i, impulses are sent to this readout and under control thereof are transmitted by wires 705 (Fig. 2i), wires 706 (Fig. 2j), relay contacts MP7—9, accumulator magnets 321MP to ground. The elusive one digit impulse is transmitted by wire 324, through relay contacts MP6, relay contacts, AV26, to the units order accumulator magnet 321MP.

The resetting of this supplemental readout MPR in Fig. 2i will also zeroize the MPR readout in Fig. 2a.

*Punching mechanism*

At this point in the operation of the machine, the quotient derived has been found to be correct and the next step is to provide for punching the quotient result on the card and at this time the construction of the preferred form of punching mechanism will now be described.

The punching mechanism is of the customary successive column acting repetition punching type as generally used in machines of this class. It is generally of the form shown in Lee and Phillips, U. S. Patent No. 1,772,186. Further changes made in this machine are shown in the Daly Patent No. 2,045,437 and for convenience are described below.

The mechanism of the punching section includes two card feed racks 581 and 582 (see Figs. 10 and 10a). Rack 582 carries an arm provided with card pusher fingers 583. The drive is derived from a motor PM which, through the reduction gear driving train shown, drives a shaft 584 which has a ratchet shaped clutch element 585 fixed on one end of it. Alongside of clutch element 585 is a gear 586 which meshes with the lower teeth of rack 581. Secured to gear 586 is a disk 587 which carries a member 588 provided with a ratchet shaped clutch tooth 589. Alongside of member 588 is another member 588b which lacks the clutch tooth. On member 588 is a pin 588c overlying an arcuate surface 588d of member 588b. The free end of member 588b is connected to a toggle member 590 by a link 591. Toggle member 590 is pivoted on disk 587 by a stud 592. The opposite end of toggle member 590 remote from its pivot 592 is connected to a spring element 593, which spring tends to hold the clutch tooth 589 out of engagement with the clutch teeth of element 585 and allows it to engage when toggle member 590 is shifted. For the purpose of effecting a clutching action, punch rack trip magnet 318 is provided, and the circuit for this magnet was previously traced. This magnet, when energized, attracts its armature and causes an arm 595 to engage a pin 596, (see Fig. 10a); (the extension of arm 595 is shown broken off in this figure for clarity) depressing member 588b and allowing member 588 to descend so that the tooth 589 engages with the ratchet 585. Upon such engagement the gear 586 will be driven in a counterclockwise direction substantially a complete revolution, shifting rack 581 to the left. This action will, through the card pusher shown in Fig. 10a, move the card from the R position to the R1 position. At the termination of the counterclockwise movement of gear 586, the tails 600 of members 588 and 588b will strike a projection 601 on a fixed plate to effect the disengagement of the tooth 589 from the ratchet 585. This action also restores the toggle parts to normal position.

The above driving action has wound up a spring in barrel 602. Upon disengagement of the clutch tooth 589, rack 581 returns to the right under the influence of the spring in barrel 602.

The driving train to the second card carriage rack 582 is as follows: Rack 581 has its upper teeth intermeshed with a gear 603 which has secured to it a member 604 having a single notch or tooth disposed in the plane of a pawl 605, which is pivoted on arm 606 fixed to the shaft 607. Arm 607 on its opposite end carries a gear 608 which meshes with the card carriage rack 582. Upon initial movement of rack 581 to the left, the block 611 will clear the pivoted camming element 609, allowing it slight counterclockwise motion so that 605 under spring action may rock and engage the tooth of member 604. Thereafter, driving will come from 581 through gear 603, through 604 to pawl 605 to 606 to shaft 607, so that the clockwise rotational movement will be imparted to shaft 607. This action will, through gear 608, traverse rack 582 to the right. The card carriage rack 582 will thus be shifted to the extreme right hand position, permitting the card pusher 583 (Fig. 10) to first ride over the surface of the card and ultimately engage back of the trailing edge of the card at the R1 position. Rack 582 has associated with it a spring drive comprising the usual spring barrel 612. This spring is wound up by the traverse of 582 to the right and is adapted to cause a movement of 582 to the left under spring action. The rack 582 also has associated with it an escapement mechanism 613 having a dog 614. This escapement is more fully described in Schaaff, U. S. Patent No. 1,426,223 and in Lee and Phillips Patent No. 1,772,186. The usual controlling contacts 358 customarily used in machines of this class are also provided cooperating with the escapement parts.

Removably secured to the card carriage rack 582 is a skip bar 616 provided with a notched portion 617 which permits skip lifter lever 618 to descend when in the notch or to remain elevated when riding on the high part of the skip bar. When the skip lifter descends into the notch, it allows the dog 614 of the escapement mechanism to cooperate with the ratchet teeth of rack 582. With skip lifter 618 riding on the top of rack 616, the escapement will be disabled so that the card carriage rack 582 can traverse without stopping at each card column until the notch 617 is reached. Thereafter, there is an intermittent motion of the card carriage to the left under spring action and under escapement control. When the skip lifter 618 again rides out of the notch, the card carriage rack 582 takes its full excursion of movement to the left. The location of the beginning of the notch in the skip lifter lever bar determines the position for the beginning of punching the product in LQR, in the present example. When the escapement dog is lifted up, the contacts 358 are open as is customary in machines of this class. It may be explained that various forms of skip bars can be placed in the machine, depending upon where punching the product is to be performed.

The punching machine proper need not be fully described as it is set forth in the Lee and Phillips patent above referred to. In brief, it comprises a set of punches 619, which punches are adapted to be depressed to perforate the card through interposers not shown but which are under control of punch selector magnets 353 shown only in wiring diagram Fig. 2g.

Referring to Fig. 10, there is shown disposed alongside of the card carriage rack 582 and fixed to the frame of the machine a block or strip of insulating material 620. Disposed in this block are a number of spots 621 of conducting material and on each side of these spots are common strips 622, 622a of conducting material. A suitable bridging piece or multiple brush assembly 623 is carried by the card carriage rack 582 and, as this card carriage rack moves, the bridging brush 623 is displaced and establishes circuit connections from the common strip 622 to one of the spots 621, depending upon the columnar position of the card carriage rack 582. In a similar manner, but differing from the Daly Patent No. 2,045,437, the bridging brush 623a establishes circuit connections from the common strip 622a to one of the spots 621 but two column positions behind the bridging brush 623. Spots 621 are preferably placed in two rows and inter-staggered as shown. This arrangement is usually termed a "reading strip."

Also securely fastened to the rack 582 are two bars 653 and 661, (Fig. 18). Slidably mounted on bar 653 is a block 654. Block 654 is so arranged to be positioned in a preselected columnar position. Fast to the block 654 is a protruding stud 655, (Fig. 17). In a like manner a block 662 is slidably mounted on bar 661 which also can be located columnarly along the bar. Also fastened to this block 662 is a protruding stud 663, (Fig. 13). Mounted between the members 657 and 658 which are in fixed relationship to the machine base are two members 656 (Fig. 15) and 664 (Fig. 12), each having respective depending extensions 660 and 665. Mounted on 656 is a bar 659 which is in juxtaposition to stud 655 so that, when stud 655 comes in contact with the bar 659 as shown in Fig. 17, the contact P9 will be closed by the action of 655 being rotated in a counterclockwise direction as viewed in Fig. 17, causing the member extension 660 to close the contact P9. In a like manner the protruding stud 663 will actuate the member 665 (Fig. 13) and cause the contact P8 to be opened by the depending extension 666, as shown in Fig. 14.

Referring now to Fig. 11, the sensing elements 651 of which there are ten, one for each of the digital values, are mounted in a strip of insulating material to be insulated from each other. Each sensing element 651 is electrically connected to the related wire connection 651a by means of the spring 652, which spring also imparts pressure to the sensing element 651, thus insuring an electrical contact to the common strip 650 through and when a hole appears in the sensed columnar position. The sensing elements 651 and its associated common strip 650 are located two columnar positions to the left of the punches 619, thus permitting the punched hole to be checked or verified when the card carriage has been stepped two columnar positions after the hole has been punched.

The energization of the A relay in the manner previously described also causes relay contacts A5 (Fig. 2i) to close to complete a circuit through the Zh and AAt relays. The energization of relay coils Zh and AAt causes the Zh2—13 and the AAt2—13 contacts (Fig. 2g) to be closed. The closure of the Zh2—13 and the AAt2—13 contacts connects the common segments of the LQR readout to the plug sockets 355, further circuit connections to the commutator readout segments 621 being made by means of the plug wires connected between plug hubs 355 and the plug hubs 356 (see also Fig. 9).

Punching of the product amount is then effected in the following manner: From ground, through the LQ5 contacts now closed, (Fig. 2g) through relay contacts A1, through the AG5 normally closed contacts, through escapement controlled or "floating cam" contacts 358, through resistance #1, to the common segment 622 of the reading strip, thence by means of the common brush 623 to the particular segments and plugs which are plug connected to hubs 355. Punching is effected starting from the highest order, and for all orders up through the AAt2—13 contacts, through the Zh2—13 contacts, thence through the group of wires designated 712 (Figs. 2g, 2f), through the LQ readout segments, through the AB1—11 contacts, and depending upon the brush position through the corresponding punch selecting magnet 353, through the P8 contacts now closed, to line 301. The energization of the selected magnet 353 causes a corresponding hole to be punched in the card. The contacts 358 (Fig. 10) act in the usual manner, opening the circuit just described and correspond to contacts 215 in the Daly Patent No. 2,045,437, allowing the punch selecting magnet 353 to be deenergized after punching. The energization of each selected magnet 353 causes a punch selector to be shifted which causes the punch contact 359 to be closed, thus completing a circuit to the punch magnet 360 as follows: From ground, through the LQ5 contact, through the A1 contacts, through the AG5 contacts, through contacts 358, through contacts 359 now closed, through the punch magnet 360, to line 301. The punch magnet 360 actually performs the work of punching the hole in the card. After the second hole has been punched in the card, the contact P8 is opened by the arrangement shown in Figs. 12–14, the settable member 662 being set on bar 661 to effect this. The card carriage is, however, spaced to the third column punching position. With contacts P8 now opened and relay contacts BA3 now opened, (Fig. 2g) no circuit can be completed through the punch selecting magnets 353 until the relay contacts BA3 are later closed. Closure of BA3 contacts is effected by the energization of BA relay in the following manner: From ground, through the LQ5 contact, through the relay contacts A1, through the AG5 contacts in the position shown, through the contacts 358, through the contacts BA2 which are normally closed, to the common reading strip 622a, through the common brush 623a to the segments 621 at the first or highest column position at the left. Thence up through the AAh2 contacts, through Zh2 contacts, and to a related wire 712, through the corresponding LQR readout segment of the highest order at the extreme left, through one of the AB1—11 contacts, up through one of a group of wires designated 711 (Fig. 2f), to one of the punch checking brushes 651, thence through the hole in the card, to the common bar 650, through the BA relay coil, to the resistance #2 to line 301. Energization of the BA relay is effected when the brush setting of LQR corresponds to the hole analyzed in a corresponding order and being energized causes its contacts to be actuated. These contacts function in a definite sequence, that is, the BA1 contacts (Fig. 2f) first close. Shortly after BA1 contacts close, BA2 contacts (Fig. 2g) then open and shortly after BA2 contacts open BA3 contacts (Fig. 2g) close. Thus, upon energization of the BA relay coil, BA1 will first close and set up a stick circuit for the BA relay as follows: From ground, through the LQ5 (Fig. 2g) contacts, through the A1 contacts, through AG5 contacts in the position shown, through the contacts 358, thence via wire 718 (Figs. 2g, 2f), through the BA1 contacts, through the BA relay coil, through the resistance #2, to line 301. Opening of the BA2 contacts prevents the completion of a circuit from line 718 (Fig. 2g) to and through the punch selecting magnets 353 by the reading strip 622a, 623a. Closure of relay contacts BA3 then completes the circuit through the selected punch selecting magnets 353 by the common strip 622 and brush 623 at the third column position to punch the third digit in the manner previously described. Thus, after punching the first two holes in the card, the first hole punched in the card is checked with the standing of the brush of the LQ readout in the corresponding order before the third hole can be punched in the card. The above operations are repeated after each column is punched.

After the last order of the quotient amount has been punched in the card the P9 contacts close by the arrangement shown in Figs. 15–17 and the checking circuit is completed for the final two orders to effect checking of the holes in the last two columns punched in the card in the following manner. The spacing of the punch carriage for these two columns is effected upon energization of the BA relay coil, which is energized in the usual way when the tens column position is reached by brush 623a, by a circuit completed as follows: From ground, through the LQ5 contacts (Fig. 2g), through the A1 contacts, through the AG5 contact in the position shown, through the contacts 358, thence via line 718 (see also Fig. 2f), through the BA1 contacts now closed, thence through the P9 contacts, thence via line 719, to and through the punch magnet 360, to line 301. Energization of the punch magnet 360 only causes the rock shaft of the escapement mechanism of the punching machine to be operated and spaces the card carriage one space. However, no hole is punched in the card due to the fact that contacts BA2 are open so that the 353 punch selecting magnets are not energized. The punched hole at the last order is now checked. After the hole in the last order has been verified, the card carriage is automatically skipped to the extreme left hand position under control of the skip bar 613 (Fig. 10) in the usual manner. In order to check the last column, it will be understood that the usual skip bar in the punch must be cut out so as not to control skipping until the last column has been checked. When the card carriage reaches its extreme left position, the punched and verified card is ejected in the usual manner. Contacts P5 are closed at the last column position, thus completing a circuit through the B relay in the manner previously described. Relay contacts B1 (Fig. 2b) close to energize the card eject magnet 361 (Fig. 10) to eject the punched card in a well known manner.

During the cycle in which the MP accumulator was reset, which is the cycle in which punching is initiated, contacts MP3 (Fig. 2c) are opened which tend to open the stick circuit for the JJ relay. This is effected when shunt cam contacts CC18 open, thus deenergizing the JJ relay. Also during this cycle, the MP2 relay contacts (Fig. 2b) are closed, and when cam contacts CC20 close the circuit is completed to the E relay coil as follows: From line 301, through cam contacts CC20, through relay contacts MP2, through the E relay coil, to ground. Energization of the E relay sets up a stick circuit for itself back through the E1 contact, through card feed cam contacts FC2 now closed, to line 301. The closing of the E2 contacts permits a circuit to be again completed in the manner previously described to the card feed clutch magnet 304, and the XC cam shaft clutch control magnet 312 when cam contacts CC29 close, thus initiating card feed operations to thus feed the next card to be computed and checked into the presensing position, and thereafter machine operations take place as has been previously described in detail.

After the next card has been fed down to the card carriage of the card punching mechanism, an LQ reset is initiated in the manner previously explained. During the LQ reset, the LQ5 contacts (Fig. 2g) are opened and when shunt cam contacts CC19 open in this cycle, the stick circuit for the A and the AB relay coils is opened, thus allowing the A and the AB relays to deenergize.

*Error designation*

If the quotient derived had been found to be in error, one or more orders of the PQR readout would not be at zero, and one or more of the CQ1 contacts (Fig. 2k) would be closed so that a circuit would have been completed through the AG relay coil instead of the A relay coil upon closure of cam contacts CC47, and this circuit is described as follows: From ground, through cam contacts CC47, through relay contacts AN4 now closed, through the transferred CQ1 contacts of the associated CQ relay which was not energized because the corresponding brush of the PQR readout was not at the zero position, through the AG relay coil, to line 301. Energization of the AG relay coil sets up a stick circuit for itself back through contacts AG1, through the manually operated contacts 721, to ground. The energization of the AG relay causes contacts AG2 (Fig. 2g) to close, contacts AG4 (Fig. 2b) to open, and contacts AG3 (Fig. 2c) to open.

The closure of AG2 contacts completes a circuit to the punch magnet 360 which effects an auto space circuit as follows: From line 301, through the punch magnet 360, through the AG2 contacts, through 358 contacts, through transferred AG5 contacts, to ground. This auto spacing circuit functions to cause the card carriage to be spaced column by column without punching the product amount on the card. After the card has been spaced to the left by the number of columns of the field reserved for recording the product amount, the card is automatically skipped to the extreme left hand position by means of the skip bar 316 to close contacts P5, in the manner previously explained.

The opening of the AG4 contacts (Fig. 2b) prevents the energization of the B relay upon closure of contacts P5, (Fig. 2b) thus preventing the machine from going into its next computing operation for the following card, and enabling the card which has been found to be in error to be examined to determine the reason for the error.

The opening of the AG3 contacts (Fig. 2c) opens the holding circuit for the AL relay coil thus allowing the AL relay to deenergize upon completion of the checking operation, if the quotient amount is found to be in error. The A4 contact normally causes this relay to deenergize when the quotient amount has been found to be correct.

Another error designation would be the detection of improper punching, that is to say, the punching machine would not have punched a column to represent a digit corresponding to the standing of the brush in the LQR readout in a corresponding order. Obviously, the improper punching would also be the failure of the operation of the punching machine to punch this digit.

It will be understood that the relay coil BA will become energized only when the amount standing on a given order of LQR corresponds to the amount previously punched and sensed by the sensing means 650—651. With the BA relay coil energized in this manner, relay contacts BA3 close and permit another punching operation, pertaining to the next column. This operation will continue until the complete quotient is punched, provided there is no interruption of the circuit controlling punching, due to possible improper perforation of the recording on the card, or the failure to record on the card. It will also be recalled that when any card reaches the last column position in the punch, the last column contacts P5 (Fig. 10) are closed which brings about the energization of the eject magnet 361 (Fig. 10) to cause ejection of the card from the punch in the manner which is usual and well known for the punching machine shown herein.

Assuming the improper conditions just described, the relay coil BA does not become energized, and further punching is immediately terminated and the card remains in the punch. This is due to the fact that the circuit is not completed to the BA relay coil (Fig. 2f) and since the latter does not become energized, the relay contacts BA3 remain open and no punching will ensue and therefore the card remains in the punch. With the card so remaining in the punch, it does not reach the last column position; accordingly the last column contacts P5 (Fig. 2b) do not reclose and there is no energization of the relay coil B at this time, thus preventing the machine from going into its next computing operation for the following card and enabling the card which has been found to be punched in error to be examined. Thus, further checking operations will be terminated and the operator is then compelled to release the incorrect card by hand. This is effected by depressing the release key of the punching machine which will cause the card carriage to be skipped to the last column position and the card ejected in the usual manner.

While there have been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention, therefore, to be limited only as indicated by the scope of the following claims:

What is claimed is:

1. In a combined multiplying and dividing machine provided with dividing mechanism for dividing divisor and dividend factors on a record and with a multiplying mechanism automatically operable thereafter to multiply the computed quotient as a multiplicand and the divisor factor as the multiplier, said dividing mechanism including a quotient receiving means and divisor and dividend receiving means receiving respective entries under control of said record for controlling said dividing mechanism, and said multiplying mechanism including multiplier digit setup means to terminate the operation of said multiplying mechanism when multiplying operations have been completed for the multiplier digits, and further including multiplier receiving means, said last named means and said divisor receiving means controlling said multiplying mechanism, the combination of means for clearing out said divisor receiving means of a divisor amount representation, means for automatically initiating the operation of the multiplying mechanism upon completion of the dividing computation for the desired number of quotient digits, means to transfer the quotient amount under control of said quotient receiving means to said cleared out divisor receiving means to be used as a factor in multiplication, record controlled means to enter the divisor factor and in said multiplier receiving means and to effect a digit set up in the multiplier digit setup means, means for terminating the operation of the dividing mechanism and including means set up to represent the number of quotient digits to be derived, means initiated in operation by said last named means for first causing, when a desired number of quotient digits have been computed the operation of said clearing means, and then the operation of the means for automatically initiating the operation of the multiplying mechanism upon completion of the dividing computation, and the operation of said transfer means to cause said cleared out divisor receiving means to receive the quotient amount as a multiplying factor, and means controlled by the multiplier digit setup means to terminate the operation of the multiplying mechanism when multiplying operations have been completed for the significant digits of the amount used as a multiplier which corresponds to the same amount used as a divisor.

2. In a combined multiplying and dividing machine of the type which includes commonly utilized amount receiving devices for providing, during dividing computations, digital multiples of the divisor for an initial computation of division and for providing, after said amount receiving devices have been cleared of their divisor multiple representations, digital multiples of the multiplicand for a subsequent multiplying computation, the combination of means for clearing said amount receiving devices, quotient digit receiving means for receiving in successively higher to lower orders thereof the quotient digits computed during the dividing computation, means set up in accordance with the number of quotient digits to be computed, means for transferring the quotient digits under control of said quotient digit receiving means to certain of said amount receiving devices for setting up the quotient amount to provide digital multiples of the multiplicand for a multiplying computation, a plurality of entry shift means selectively operable according to the number of quotient digits to be computed for denominationally routing the entries effected by the aforesaid transfer means to cause the digits of the quotient amount to be entered in the right hand orders of said amount receiving devices, and means controlled by said quotient digit setup means to effect the automatic operation of the aforesaid clearing means when the desired number of quotient digits have been computed to clear said amount receiving devices of their divisor multiple representations before receiving the routed quotient entries.

3. In a combined dividing and multiplying machine comprising record controlled dividing means for effecting under control of a record controlled divisor and dividend receiving means the computation of division for a predetermined number of quotient digits entered in a quotient receiving means, said dividend receiving means representing a possible remainder upon the completion of division, said machine further including a multiplying means to subsequently multiply the divisor amount derived from the record and the quotient amount derived from the quotient receiving means and for entering the product in a product receiving means in lower orders thereof, the combination of a supplemental dividend receiving means, means to sense the record to determine the number of digits of the dividend amount on the record, entry shift means controlled thereby to denominationally shift the dividend entry in higher orders of the first named dividend receiving means and in said supplemental dividend receiving means, a plurality of control means, and means to set up one or more thereof corresponding to the number of quotient digits that are computed, a plurality of setup means and means to selectively set the latter in accordance with the number of digits of the divisor amount, a plurality of entry shift means, means controlled conjointly by the plurality of control means and said set up means for selecting an entry shift means for operation, and complement transfer means to transfer under control of said entry shift means and said supplemental dividend receiving means the amount on the latter to said lower orders of said product receiving means, said transferred amount added to the product amount in the product receiving means bringing the latter to a zero status.

4. In a combined multiplying and dividing machine provided with means for feeding records in succession through the machine to control a dividing computation and having a dividing mechanism operable under control of receiving means apart from the record, means for analyzing said record and entry means controlled thereby for concurrently entering prior to the division computation the dividend and divisor in the respective receiving means, said dividing mechanism including a quotient receiving means, multiplying mechanism automatically operable upon the completion of the division computation and controlled by multiplier and multiplicand receiving means independent of said record, means under control of said divisor analyzing means for entering concurrently with the preceding entry the divisor amount in one of the aforesaid receiving means of the multiplying mechanism to be available as a factor in multiplication, means for initiating and effecting the operation of the multiplying mechanism under control of the respective receiving means, means to transfer the quotient amount from said quotient receiving means to the other receiving means of the multiplying mechanism, means including preset means set up to represent the number of quotient orders to be computed for terminating the operation of the dividing mechanism when the desired number of quotient orders have been computed, and means initiated in operation by said last named means for effecting, when the desired number of quotient orders have been computed, the operation of said transfer means and thereafter the automatic operation of the means for initiating and effecting the operation of the multiplying mechanism under control of the respective receiving means.

5. In a combined multiplying and dividing machine provided with means for feeding records in succession through the machine to control a dividing computation and to a result recording position, and having a dividing mechanism operable under control of the record, means for analyzing said record for controlling said dividing mechanism, said dividing mechanism including a quotient receiving means, multiplying mechanism including product receiving means and automatically operable upon the completion of the division computation and controlled by multiplier and multiplicand receiving means independent of said record for effecting a multiplying operation and for entering the computed product in a product receiving means, means under control of said divisor analyzing means for entering the divisor amount in one of the aforesaid receiving means of the multiplying mechanism to be available as a factor in multiplication, means for initiating and effecting the operation of the multiplying mechanism upon completion of the dividing computation, means to transfer the quotient amount from said quotient receiving means to the other receiving means of the multiplying mechanism, means including preset means set up to represent the number of quotient orders to be computed for terminating the operation of the dividing mechanism when the desired number of quotient orders have been computed, means initiated in operation by said last named means for effecting, when the desired number of quotient orders have been computed, the operation of said transfer means and thereafter the automatic operation of the means for initiating and effecting the operation of the multiplying mechanism under control of the respective receiving means, recording means for recording after the multiplying computation the quotient amount under control of the quotient receiving means, means for determining whether the dividend amount derived from the record corresponds to the product amount in said product receiving means, and means controlled by said determining means to suppress recording when lack of correspondence is determined, and for initiating result recording upon correspondence in all digital orders.

6. In a combined multiplying and dividing machine provided with means for feeding records in succession through the machine to control a dividing computation and then prior to a subsequent computation feeding said record to a result recording position, and having a dividing mechanism operable under control of divisor and dividend receiving means apart from the record, means for analyzing said record and entry means controlled thereby for entering the dividend and divisor in the respective receiving means, said dividing mechanism including a quotient receiving means, multiplying mechanism automatically operable upon the completion of the division computation and controlled by multiplier and multiplicand receiving means independent of said record for effecting a multiplying operation and for entering the computed product in a product receiving means, means under control of said divisor analyzing means for entering the divisor amount in one of the aforesaid receiving means of the multiplying mechanism to be available as a factor in multiplication, means for initiating and effecting the operation of the multiplying mechanism upon completion of the dividing computation, means to transfer the quotient amount from said quotient receiving means to the other receiving means of the multiplying mechanism, means including preset means set up to represent the number of quotient orders to be computed and for terminating the operation of the dividing mechanism when the desired number of quotient orders have been computed, means initiated in operation by said last named means for effecting, when the desired number of quotient orders have been computed, the operation of said transfer means and the automatic operation of the means for initiating and effecting the operation of the multiplying mechanism under control of the respective receiving means, recording means for recording after the multiplying computation the quotient amount under control of the quotient receiving means, means for determining whether the dividend amount derived from the record corresponds to the product amount in said product receiving means, and means controlled by said determining means to suppress recording when lack of correspondence is determined, and for initiating result recording upon correspondence in all digital orders.

7. In a combined multiplying and dividing machine provided with means for feeding records in succession through the machine to control a dividing computation and then prior to a subsequent computation feeding said record to a result recording position, and having a dividing mechanism operable under control of receiving means apart from the record and comprising dividend and divisor amount receiving means, clearing means for said divisor receiving means, means for analyzing said record and entry means controlled thereby for entering the dividend and divisor in the respective receiving means, said dividing mechanism including a quotient receiving means, multiplying mechanism automatically operable upon the completion of the division computation and controlled by multiplier and multiplicand receiving means independent of said record for effecting a multiplying operation and for entering the computed product in a product receiving means, means under control of said divisor analyzing means for entering the divisor amount in one of the aforesaid receiving means of the multiplying mechanism to be available as a factor in multiplication, means for initiating and effecting the operation of the multiplying mechanism upon completion of the dividing computation, means to transfer the quotient amount from said quotient receiving means to the cleared out divisor receiving means to be utilized as a multiplier factor in the operation of the multiplying mechanism, means including preset means set up to represent the number of quotient orders to be computed for terminating the operation of the dividing mechanism when the desired number of quotient orders have been computed, means initiated in operation by said last named means for first effecting the operation of said clearing means and thereafter effecting the operation of said transfer means and the automatic operation of the means for initiating and effecting the operation of the multiplying mechanism under control of the respective receiving means, recording means for recording after the multiplying computation the quotient amount under control of the quotient receiving means, means for determining whether the dividend amount derived from the record corresponds to the product amount in said product receiving means, and means controlled by said determining means to suppress recording when lack of correspondence is determined, and for initiating result recording upon correspondence in all digital orders.

8. In a combined multiplying and dividing machine provided with means for feeding records in succession through the machine to control a dividing computation and then prior to a subsequent computation feeding said record to a result recording position, and having a dividing mechanism operable under control of amount receiving means apart from the record and comprising dividend and divisor amount receiving means, clearing means for said divisor receiving means, means for analyzing said record and entry means controlled thereby for entering the dividend and divisor in the respective receiving means, said dividing mechanism including a quotient receiving means for successively receiving in orders beginning at the left the quotient digits computed, multiplying mechanism automatically operable upon the completion of the division computation and controlled by multiplier and multiplicand receiving means independent of said record for effecting a multiplying operation and for entering the computed product in a product receiving means, means under control of said divisor analyzing means for entering the divisor amount in one of the aforesaid receiving means of the multiplying mechanism to be available as a factor in multiplication, means for initiating and effecting the operation of the multiplying mechanism under control of the multiplier and multiplicand receiving means, means to transfer the quotient amount from said quotient receiving means to the cleared out divisor receiving means to be utilized as a multiplier factor in the operation of the multiplying mechanism, a plurality of entry shift means selectively operable according to the number of quotient digits to be computed for denominationally routing the entries effected by the aforesaid transfer means to cause the digits of the quotient amounts to be entered in the right hand orders of said cleared out divisor receiving means to be utilized as a factor in the multiplying computation, means including preset means set up to represent the number of quotient orders to be computed for terminating the operation of the dividing mechanism when the desired number of quotient orders have been computed, means initiated in operation by said last named means for first effecting the operation of said clearing means and thereafter effecting the operation of said transfer means when the desired number of quotient orders have been computed and the automatic operation of the means for initiating and effecting the operation of the multiplying mechanism under control of the respective receiving means, recording means for recording after the multiplying computation the quotient amount under control of the quotient receiving means, means for determining whether the dividend amount derived from the record corresponds to the product amount in said product receiving means, and means controlled by said determining means to suppress recording when lack of correspondence is determined, and for initiating result recording upon correspondence in all digital orders.

JAMES W. BRYCE.